United States Patent [19]
Shintani et al.

[11] Patent Number: 5,937,214
[45] Date of Patent: Aug. 10, 1999

[54] CAMERA CAPABLE OF CORRECTING A SHAKE

[75] Inventors: Dai Shintani, Kishiwada; Toshihiko Hirota, Habikino; Hideki Nagata, Sakai, all of Japan

[73] Assignee: Minolta Co., Ltd., Osaka, Japan

[21] Appl. No.: 08/979,696

[22] Filed: Nov. 26, 1997

[30] Foreign Application Priority Data

Nov. 29, 1996 [JP] Japan .................................. 8-319996

[51] Int. Cl.⁶ .................................................. G03B 17/00
[52] U.S. Cl. ................................................................ 396/55
[58] Field of Search ........................................ 396/52, 55

[56] References Cited

U.S. PATENT DOCUMENTS 5,615,397  3/1997  Shiomi et al. ............................ 396/55

FOREIGN PATENT DOCUMENTS 07218970  5/1995  Japan .

*Primary Examiner*—W. B. Perkey
*Attorney, Agent, or Firm*—McDermott, Will & Emery

[57] ABSTRACT

A camera capable of correcting a shake includes a shake amount detector for detecting a shake amount of an object light image on an exposure plane, a memory for storing data in connection with a shake due to operation of a shutter release member, a calculator for calculating a shake correction control value based on a shake amount detected by the shake amount detector after operation of the shutter release member and the data stored in the memory, and a controller for controlling the optical system in accordance with a calculated shake correction control value to correct the shake.

16 Claims, 15 Drawing Sheets

CAMERA CAPABLE OF CORRECTING A SHAKE

BACKGROUND OF THE INVENTION

This invention relates to a camera capable of correcting a shake image blurring which can provide a distinct picture by correcting a shake of a light image projected on an exposure plane due to a camera shake.

A variety of shake-correctable cameras have been proposed. They are generally constructed such that a taking lens having a changeable optical axis and a sensor for detecting a shake direction and a shake amount of a light image of an object (hereinafter, referred as to "object light image") on an exposure plane (hereinafter, referred as to "shake information") caused by a camera shake are provided and the optical axis of the taking lens is changed based on the shake information detected by the sensor to cancel the shake of the light image on the exposure plane.

Specifically, a shake amount is predicted based on a rate of change of a shake amount detected by the sensor in a specified cycle, and the optical axis of the taking lens is changed in a specified cycle to cancel the predicted shake amount.

According to such a shake correction method, it is very difficult to predict a shake amount when there is a discontinuous and sudden shake. The shake correction using a shake amount before occurrence of such a sudden shake cannot provide a sufficient shake correction. In a picture taking, exposure is instructed by fully pressing a shutter release button. A sudden shake often occurs immediately after the operation of pressing the shutter release button due to a force applied thereto. Thus, if the shake correction and the exposure are started immediately after the instruction of the exposure, the reliability of the shake correction is considerably reduced.

In order to solve the above problem, for example, Japanese Unexamined Patent Publication No. 7-218970 discloses a shake correctable camera in which exposure is prohibited for a predetermined time which lasts until a sudden shake caused by the shutter release button pressing operation disappear after the instruction of exposure is given, in other words, exposure is started at a delayed timing after the instruction thereof.

Since the start of exposure is delayed by the predetermined time after the instruction thereof is given in the shake correctable camera disclosed in the above publication, it takes a long time until the exposure is completed after the shutter release button is operated. Particularly, if a sufficient delay time is provided to ensure the reliability of the shake correction, it gives a photographer an unnatural sense of shutter release. Further, even if the photographer performs a shutter release upon deciding that a good timing for shutter release has come, the exposure timing is delayed from the shutter release timing. Accordingly, the operability of the camera is considerably reduced.

SUMMARY OF THE INVENTION

It is an object of the present invention to provide a shake correctable camera which has overcome the problems residing in the prior art.

According to an aspect of the present invention, a camera is provided with a shake amount detector which detects a shake amount of a light image of an object on an exposure plane, a storage device which stores data in connection with a shake due to operation of a shutter release member, a calculator which calculates a shake correction control value based on a shake amount detected by the shake amount detector after operation of the shutter release member and the data stored in the memory, and a controller which controls an optical system of the camera in accordance with a calculated shake correction control value to correct a shake of the light image on the exposure plane.

According to another aspect of the present invention, a camera is provided with a shake amount detector which detects a shake amount of a light image of an object on an exposure plane at a specified timing, a data generator which generates data in connection with a shake due to operation of a shutter release member based on a shake amount detected by the shake amount detector after operation of the shutter release member, a storage device which stores the data generated by the data generator, a calculator which calculates a shake correction control value based on a shake amount detected by the shake amount detector after operation of the shutter release member and the data stored in the memory, and a controller which controls an optical system of the camera in accordance with a calculated shake correction control value to correct a shake of the light image on the exposure plane.

According to another aspect of the present invention, a method for correcting a shake of a camera comprising detecting a shake amount of a light image of an object on an exposure plane after operation of a shutter release member, calculating a non-shutter-release shake amount due to causes other than operation of the shutter release member by subtracting a shutter-release shake amount due to operation of the shutter release member from the detected shake amount, the shutter-release shake amount being stored in a memory in advance, calculating a first shake correction control value based on a calculated non-shutter-release shake amount, calculating a second shake correction control value based on the shutter-release shake amount stored in the memory, calculating a net shake correction control value by adding up the first and second shake correction control values, and controlling an optical system for focussing the light image on the exposure plane in accordance with a calculated net shake correction control value to correct a shake of the light image on the exposure plane.

These and other objects, features and advantages of the present invention will become more apparent upon a reading of the following detailed description and accompanying drawings.

DETAILED DESCRIPTION OF THE PREFERRED EMBODIMENT OF THE INVENTION

Figure 1:
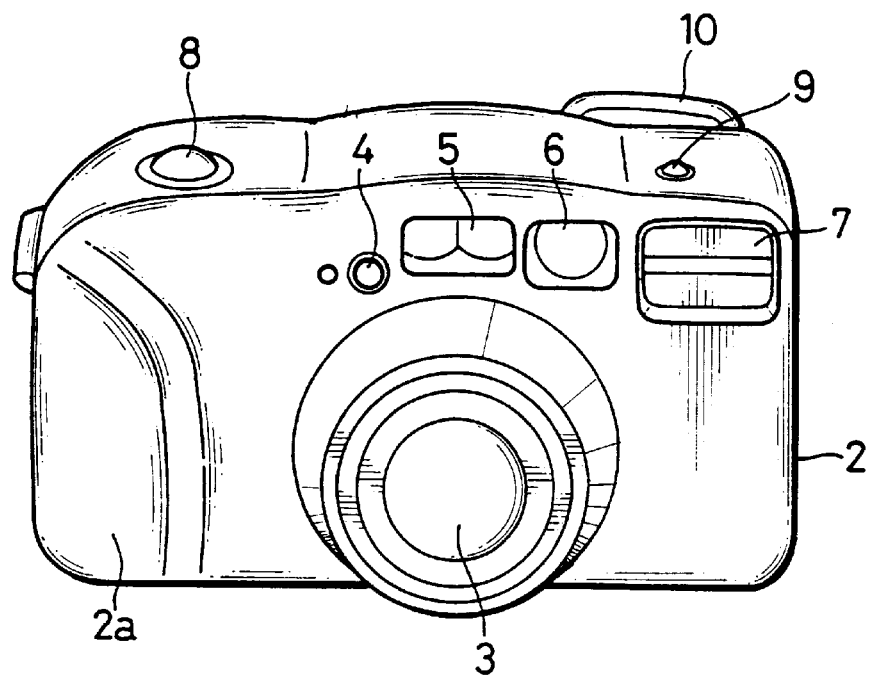
FIG. 1 is a perspective view showing an external configuration of a shake correctable camera embodying the present invention, when viewed from front.
Figure 2:
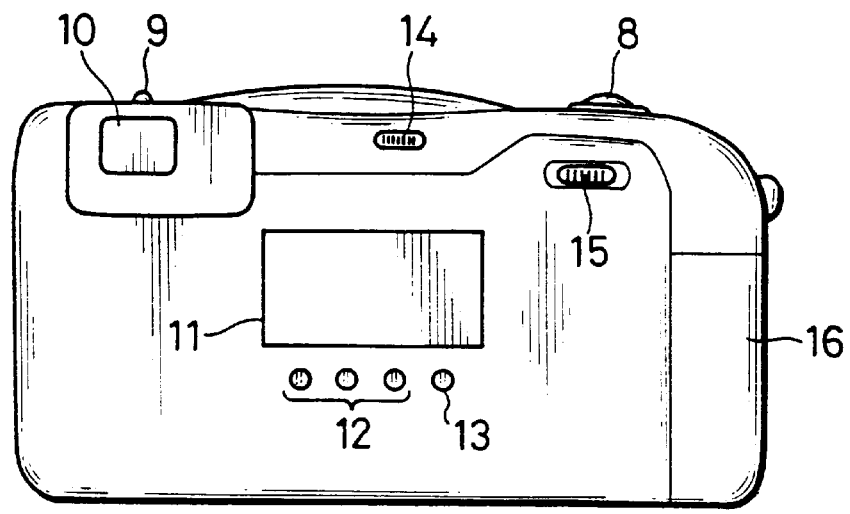
FIG. 2 is a rear view showing the external configuration of the shake correctable camera.

Referring to FIGS. 1 and 2 showing an external configuration of a shake correctable camera according to an embodiment of the invention, a camera 1 is provided with a shake correcting function so that photographing can be performed while correcting a shake of a photographed image due to a camera shake. The camera 1 includes a taking lens 3, which is comprised of a zoom lens, substantially in the middle of the front surface of a camera main body 2. An optical system for the shake correction to be described later is provided inside the taking lens 3. In a lens system of the taking lens 3 is provided a lens shutter made by combining a plurality of shutter blades.

A distance metering window 5 is provided in the front surface of the camera main body 2 and above the taking lens 3, and a light metering window 4 is provided at the left side of the distance metering window 5. A viewfinder window 6 is provided at the right side of the distance metering window 5, and a built-in flash 7 which operates in association with zooming is provided at the right side of the viewfinder window 6.

In a position of the camera main body 2 behind the light metering widow 4 is provided a light metering circuit including light receiving elements such as SPCs. Light from an object is received by these light receiving elements to detect a brightness of the object. In a position of the camera main body 2 behind the distance metering window 5 is provided a distance metering circuit of a phase difference detecting system which includes light receiving elements comprised of a pair of line image sensors. The distance metering circuit detects a distance to the object by receiving the light from the object by means of the light receiving elements.

Figure 3:
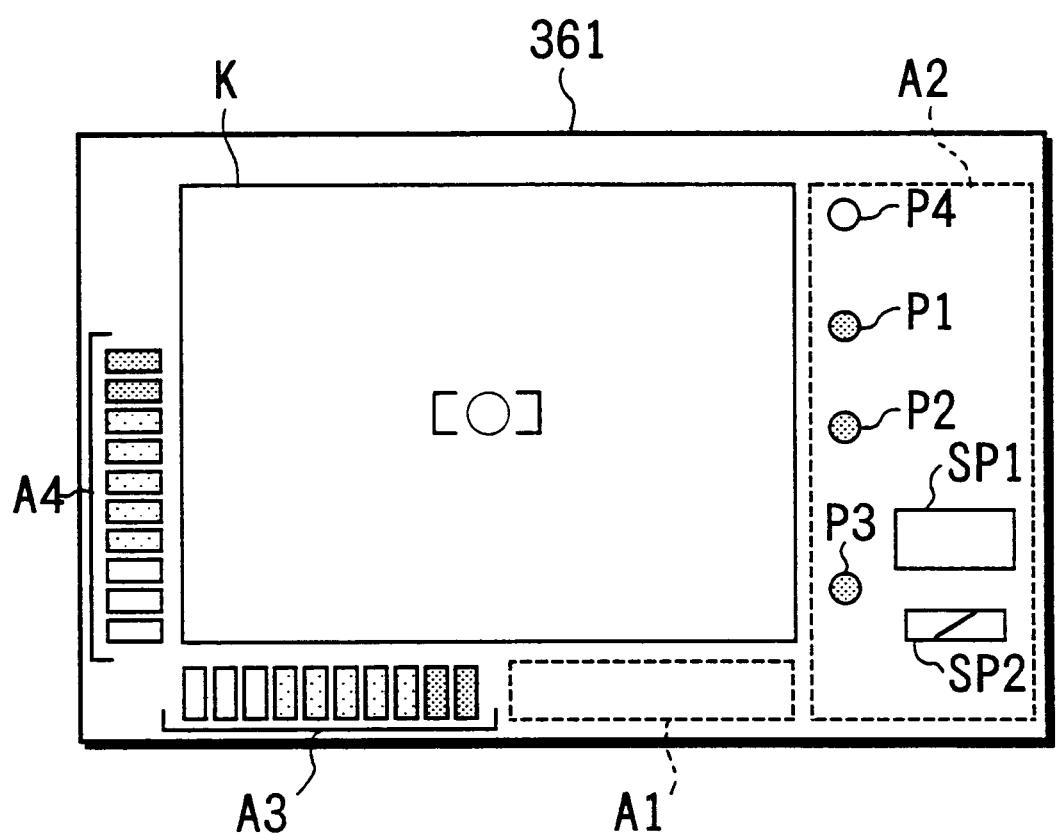
FIG. 3 is a diagram showing a display portion inside a viewfinder of the shake correctable camera.

In a position of the camera main body 2 behind the viewfinder window 6 is provided a viewfinder optical system for introducing an object light image to a viewfinder eyepiece window 10 provided in the rear surface of the camera main body 2. In the viewfinder optical system is provided a sensor comprised of a CCD area sensor for detecting information concerning a shake of the object light image on an exposure plane (information on a shake direction and a shake amount). Inside the viewfinder optical system is provided display portions for displaying a view frame and information on a shake correction of the object light image shaking due to a camera shake (hereinafter, "blur image"), as shown in FIG. 3.

The display portions are provided below and on the opposite lateral sides of the view frame K. In a display area A1 provided below the view frame K is displayed information on AF (automatic focusing), AE (automatic exposure control) and flash firing. In a display area A2 at the right side of the view frame K is displayed information on the shake correction. In display areas A3, A4 provided at the lower left corner of the view frame K are displayed a shake amount of a blur image which is detected by a shake detecting circuit to be described later.

In the display area A2 are provided LED indicators P1, P2, P3, P4 and symbol mark indicators SP1, SP2. The LED indicator P1 indicates that a shake correction mode to be described later is set, and the LED indicator P2 indicates that the shake correction mode is not set. The LED indicator P3 indicates that the shake correction cannot be performed. The symbol mark indicators SP1, SP2 indicate causes as to why the shake correction cannot be performed. In other words, the symbol mark indicator SP1 indicates that the shake correction cannot be effectively performed due to an excessive shake amount, and the symbol mark indicator SP2 indicates that the shake correction cannot be performed due to an excessively low voltage of a power battery. The information as to whether the shake correction is to be performed is given by turning the LED indicators P1, P2, P3 and the symbol mark indicators SP1, SP2 on.

The LED indicator P4 indicates that a shutter release operation (full pressing of the shutter release button 8) is possible in a shake memory mode for storing data on a camera shake which is peculiar to a photographer and is caused by the shutter release operation (hereinafter, "release shake data"). The LED indicator P4 is turned on when the shutter release operation by the photographer is enabled while the release shake data is stored in the shake memory mode.

A level indicator made by aligning a plurality of LEDs is provided in each of the display areas A3, A4. The level indicator in the display area A3 indicates a shake amount in X-direction (lateral direction), whereas the one in the display area A4 indicates a shake amount in Y-direction (vertical direction).

Referring back to FIG. 1, a grip 2a is provided on the left side of the camera main body 2, and a shutter release button 8 is provided in a position above the grip 2a on the upper surface of the camera main body 2. The shutter release button 8 is an operable member of a switch S1 (see FIG. 4) which is turned on when the button 8 is partly pressed and of a switch S2 (see FIG. 4) which is turned on when the button 8 is fully pressed. When the switch S1 is turned on, the object brightness is detected by the light metering circuit, and exposure control values (a control aperture value and a control shutter speed) are calculated based on the detected object brightness. Further, the object distance is detected by the distance metering circuit, and AF control is performed based on this detection result. Furthermore, a check is made on the power battery as to whether it is sufficiently charged to enable the shake correction (hereinafter, "battery check"), and this check result is indicated in the display area A2.

At the right side of the upper surface of the camera main body 2 is provided a shake correction mode setting button 9 for setting the shake correction mode. In the shake correction mode, photographing is performed while correcting a blur image when a camera shake has occurred. The photographer is allowed to extractively set the shake correction mode, considering a case where a blur image is intentionally photographed to obtain an obscuring effect.

When the shake correction mode setting button 9 is operated, a shake correction switch $S_B$ (see FIG. 4) is turned on and information that the button 9 has been operated is inputted to a controller 20 (see FIG. 4) for centrally controlling the photographing operation of the camera. When the camera is activated, the shake correction mode is initialized to "OFF". Every time an ON-signal of the shake correction switch $S_B$ is inputted, the shake correction mode is alternately switched to "ON" and "OFF" and the corresponding LED indicators P1, P2 in the display area A2 within the viewfinder are accordingly turned on.

The viewfinder eyepiece window 10 is provided in an upper left part of the rear surface of the camera main body 2, and a display device 11 comprised of an LCD is provided substantially in the middle of the camera main body 2. The LCD device 11 is adapted to display a variety of pieces of information on the photographing by the camera (exposure control values, battery capacity, flash firing, photographing mode, film sensitivity, information as to whether the shake correction is to be performed). In a position below the LCD device 11 is provided an operation button 12 for selecting the photographing mode (self-timer photographing mode, continuous photographing mode, other photographing mode), a flash firing mode, a red-eye reduction function, a photographic scene. A main switch 14 is provided above the LCD device 11. Further, a zoom switch 15 is provided in an upper right portion of the rear surface of the camera main body 2. A zooming ratio of the taking lens 3 is changed by operating the zoom switch 15.

In a right end portion of the camera main body 2 is provided a battery chamber 16 in which a power battery E is set. The power battery E acts as a power supply source for a variety of controls including flash firing, AE/AF and exposure controls and as a power supply source for the detection of the information concerning the camera shake and the driving of the optical system for the shake correction.

Figure 4:
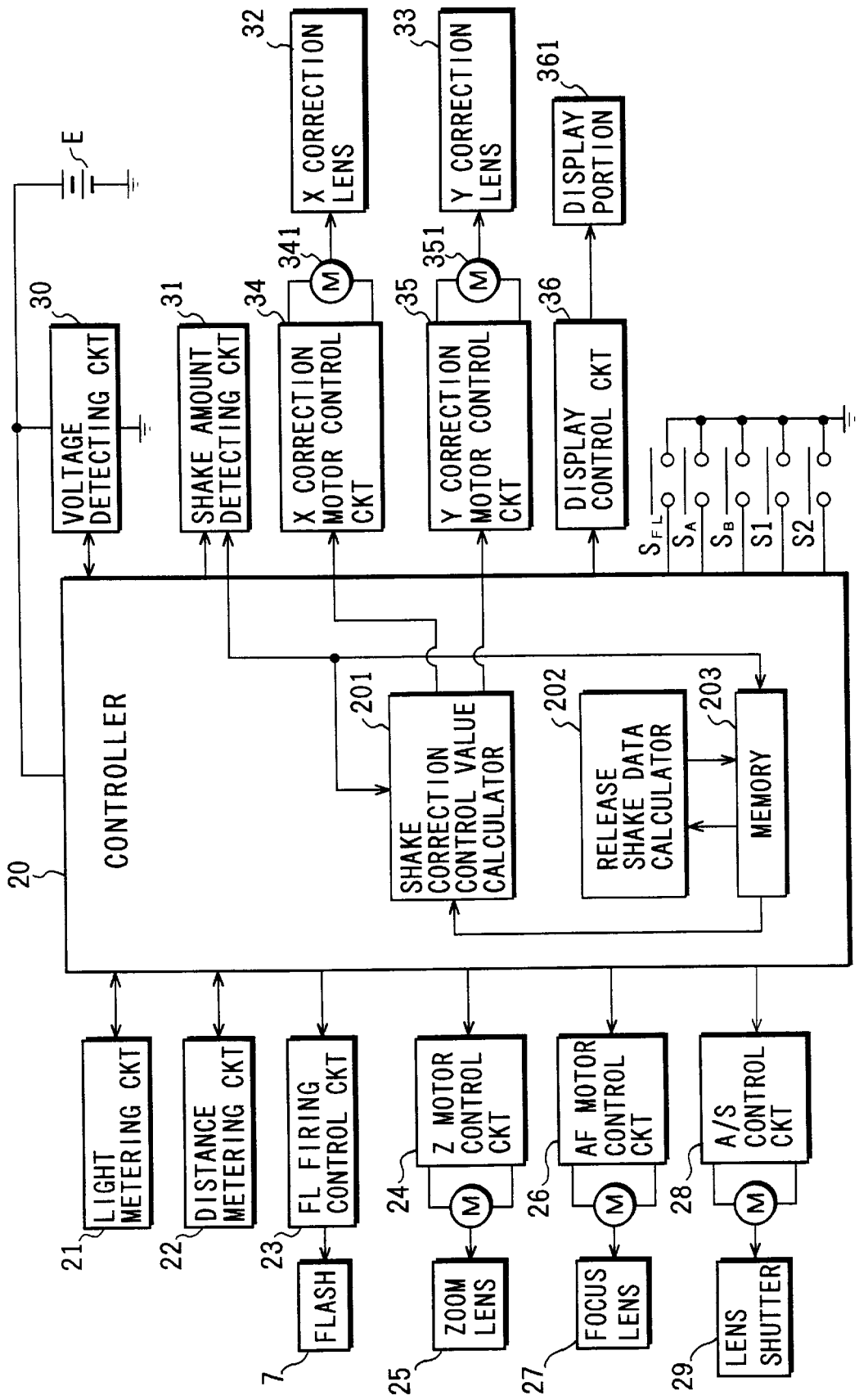
FIG. 4 is a block diagram showing a construction of the shake correctable camera.

Referring to FIG. 4 showing a construction of the shake correctable camera, the controller 20 is a microcomputer for centrally controlling a series of photographing operations of the camera 1 including the AF, AE, exposure control and shake correction. The controller 20 is provided with a shake correction control value calculator 201 for calculating drive control values of a shake correction lens for correcting the shake in X-direction and of a shake correction lens 33 for correcting the shake in Y-direction. The controller 20 is also provided with a release shake data calculator 202 for calculating the release shake data in the shake memory mode and a memory 203 for storing data necessary to conduct such a calculation and calculation results. A method for calculating the release shake data in the shake memory mode is described later.

Every time shake amounts $\xi x$, $\xi y$ in X- and Y-directions detected by a shake amount detecting circuit 31 to be described later are inputted, e.g., during a photographing preparation where the shutter release button 9 is partly pressed, the controller 20 outputs these detection values to a display control circuit 36 to display a current state of the camera shake.

Further, every time the shake amounts $\xi x$, $\xi y$ in X- and Y-directions detected by the shake amount detecting circuit 31 are inputted during the exposure control, the controller 20 causes the shake correction control value calculator 201 to calculate the drive control values of the shake correction lenses 32, 33 for performing the shake correction based on these detection results, and outputs X-direction and Y-direction drive control values to shake correction motor control circuits 34, 35, respectively to optically correct the shake of the object light image on the exposure plane.

A light metering circuit 21 detects an object brightness, and a distance metering circuit 22 detects an object distance. The controller 20 sets exposure control values based on the detected object brightness and sets an AF control value of the taking lens 3 based on the detected object distance.

A flash firing control circuit 23 controls the firing of the built-in flash 7. This circuit 23 causes the built-in flash 7 to emit a specified amount of light based on a light emission amount inputted from the controller 20 at a specified emission timing inputted from the controller 20.

A zooming motor control circuit 24 controls the driving of a zoom lens 25 in the taking lens 3. To the control circuit 24 is inputted a drive signal which is generated in the controller 20 based on an operated direction and an operated amount of the zoom switch 15. The control circuit 24 in turn controls the driving of the zoom lens 25 in accordance with this drive signal. An AF motor control circuit 26 controls the driving of a focusing lens 27 in the taking lens 3. This control circuit 26 automatically focuses the taking lens 3 by controlling the driving of the focusing lens 27 in accordance with the AF control value inputted from the controller 20.

An aperture/shutter control circuit 28 controls an aperture diameter of a lens shutter 29 and the opening and closing of the lens shutter 29. This control circuit 28 sets a maximum aperture diameter of the lens shutter 29 in accordance with the exposure control values inputted from the controller 20, and opens and closes the lens shutter 29 at a specified timing.

The power battery E is a main power source of the camera 1 and is accommodated in the battery chamber 16. A voltage detecting circuit 30 detects a voltage of the power battery E. The voltage detecting circuit 30 is, for example, comprised of two series circuits of high resistance which are connected in parallel with the power battery E. This circuit 30 detects the voltage of the power battery E by resistance-dividing it, and inputs the detection value to the controller 20.

At the time of activation and/or at the start of the photographing preparation designated by the switch S1, the controller 20 checks the power battery E based on the detected voltage which is inputted from the voltage detecting circuit 30 to discriminate whether or not a photographing control can be performed. When the shake correction mode is set by the shake correction mode setting button 9, the power battery E is checked based on the detected voltage inputted from the voltage detecting circuit 30 when the shake correction switch SB and the switch S1 are turned on, thereby discriminating whether or not an optical shake correction can be performed.

Assuming that $V_{max}$, $V_B$, $V_{min}$ denote a maximum voltage level of the battery E, a minimum voltage level at which the shake correction lens can be stably driven and a minimum voltage level of the battery E at which the photographing can be performed, when the shake correction mode is set, the controller 20 causes the shake amount detecting circuit 31 to detect a shake amount if the detected voltage V is: $V_B < V \leq V_{max}$, discriminates based on the detection result as to whether the shake correction can be performed, and displays the discrimination result in a display portion 361 inside the viewfinder. Further, if the shake correction can be performed, the controller 20 performs the shake correction during the exposure control. On the other hand, if $V_{min} < V \leq V_B$, the controller 20 only displays the discrimination result as to whether the shake correction can be made, but does not perform any optical shake correction.

The shake amount detecting circuit 31 detects the shake amount of the photographed image on the exposure plane due to the camera shake. Since the shake correction lens is comprised of a group of lenses 32, 33 which are displaceable in X- and Y-directions which are normal to each other, the shake amount is detected in both X- and Y-directions. The detected shake amount is inputted to the controller 20, which calculates the drive control values of the shake correction lenses 32, 33 based on the received shake amount.

Figure 5:
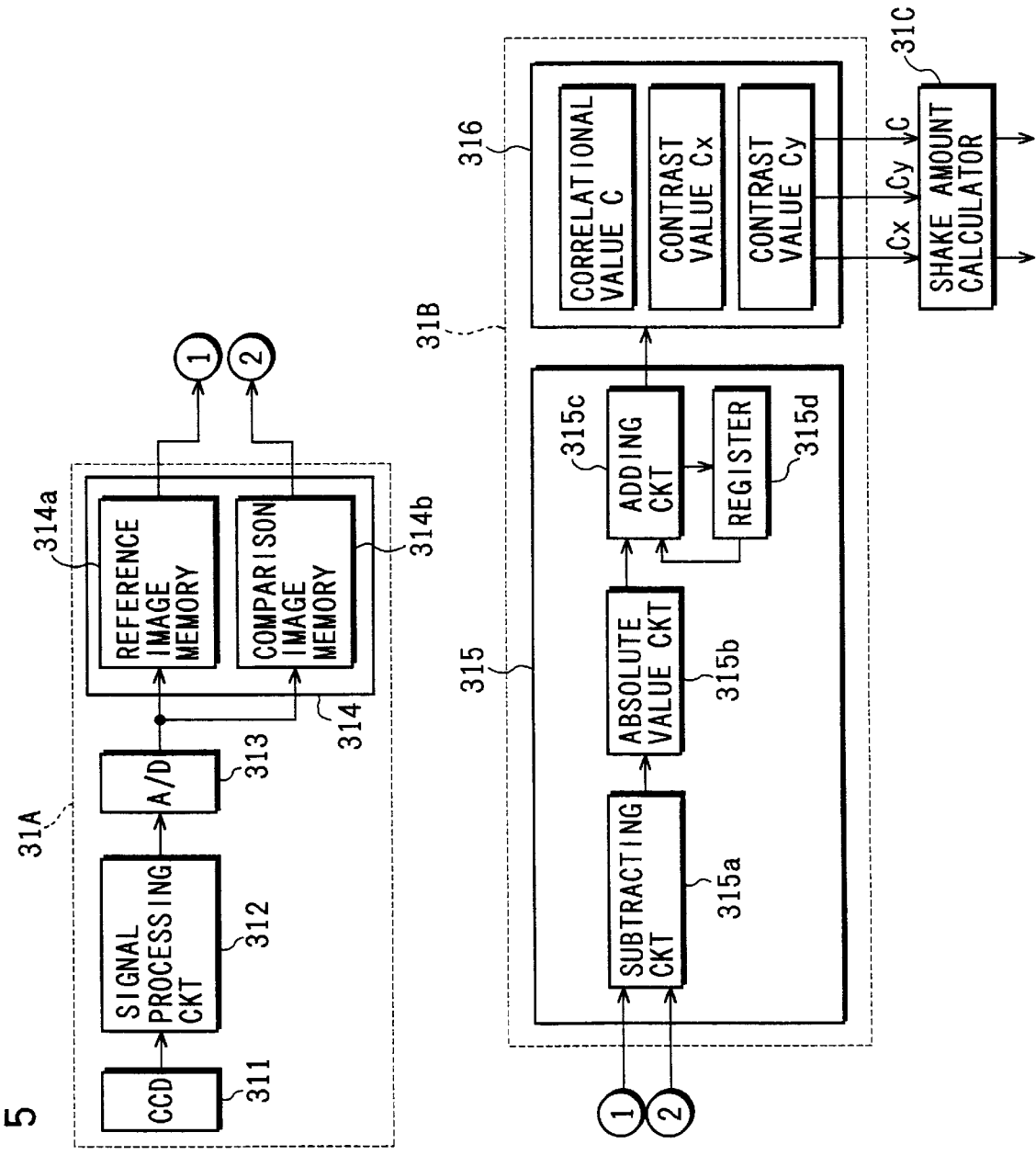
FIG. 5 is a block diagram showing a construction of a shake amount detecting circuit.

Referring to FIG. 5 showing a construction of the shake amount detecting circuit 31, in this embodiment, even if $V_{min} < V \leq V_B$, at least the shake amount detection is made. Accordingly, the shake amount detecting circuit 31 is constructed using a CCD area sensor in order to save a power to be consumed. The shake amount detecting circuit 31 shown in FIG. 5 is basically identical to the one disclosed, for example, in U.S. Pat. No. 5,218,442. Accordingly, this detecting circuit 31 is summarily described without giving any detailed description.

The shake amount detecting circuit 31 includes an image pickup 31A provided with a CCD area sensor 311, a correlational value calculator 31B for calculating contrast values Cx, Cy in X- and Y-directions from the picked image and a correlational value C, and a shake amount calculator 31C for calculating shake amounts in X- and Y-directions based on the calculation results in the correlational value calculator 31B.

The image pickup 31A is comprised of the CCD area sensor 311, a signal processing circuit 312, an analog-to-digital (A/D) converter 313 and an image memory 314. The CCD area sensor 311 is a sensor provided inside the viewfinder optical system and is an image pickup device for picking up an object light image by converting it into an electrical signal. The CCD area sensor 311 may be either a color sensor or a monochromatic sensor. The signal processing circuit 312 applies a level correction, a noise removal and other signal processing to light reception signals of the respective pixels which are outputted from the CCD area sensor 311. The A/D converter 313 converts the light reception signals (analog signals) of the respective pixels into digital signals (hereinafter, "pixel data").

The image memory 314 is a memory for storing the image data (a group of pixel data constituting an image) picked up by the CCD area sensor 311. The image memory 314 includes a reference memory 314a having a storage capacity of one frame of image data and a comparison memory 314b having the same storage capacity. In the reference memory 314 is stored data of a reference image used for the shake amount detection (an image first picked up during the shake amount detection). In the comparison memory 314b are successively and renewably stored a plurality of frames of comparison images (a plurality of images cyclically picked up to be compared with the reference image).

Figure 6:
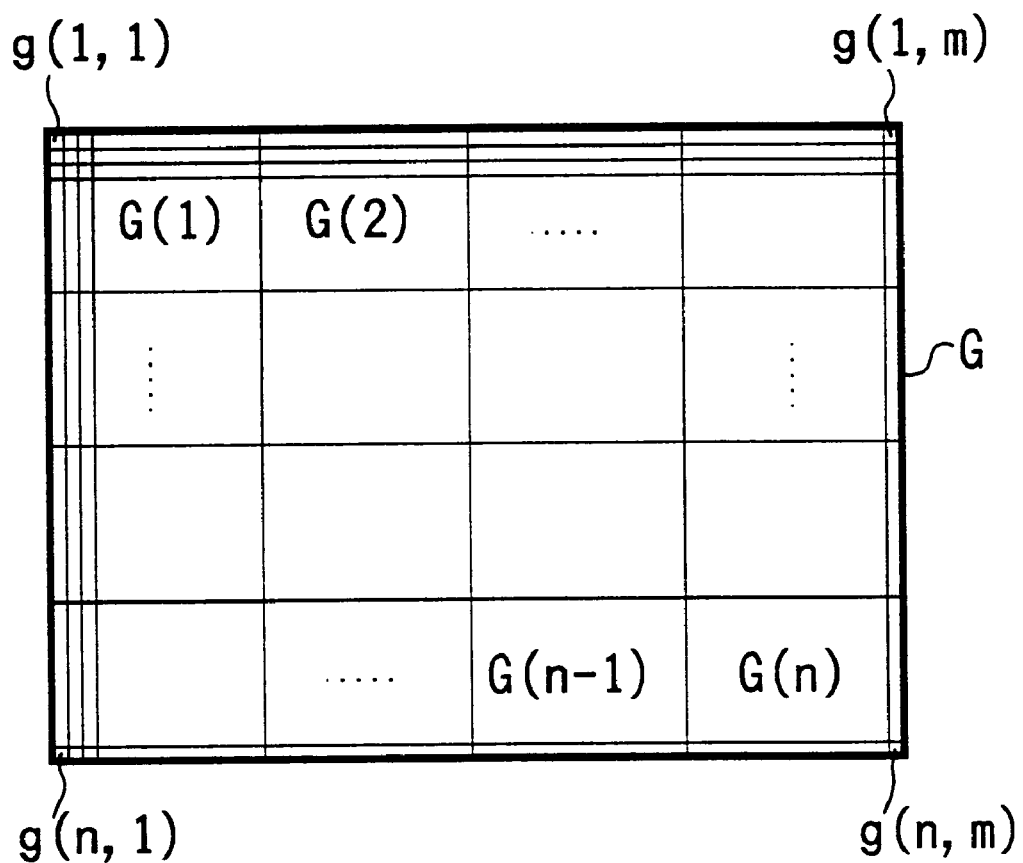
FIG. 6 is a diagram showing a division of a picked up image into a number of blocks.

The correlational value calculator 31B includes a calculating circuit 315 for calculating contrast values Cx, Cy in X- and Y-directions and a correlational value C and a memory 316 for storing calculation results of the calculating circuit 315. In order to calculate the correlational value C, the correlational value calculator 31B divides a picked image G into images G(1) to G(n) in a plurality of small blocks as shown in FIG. 6 and calculates contrast values Cx(I), Cy(I) (I=1, 2, . . . n) in X-direction (horizontal direction) and Y-direction (vertical direction) for each of the divided images G(1) to G(n). Then, a specified number m (<n) of divided images are extracted to calculate the correlational value C in X- and Y-directions from the contrast values Cx(I), Cy(I). For example, four each of divided images are extracted from 48 divided images G(1) to G(48) to calculate shake amounts in X- and Y-directions. Such extracted divided images are located in a high contrast portion of the picked image, so that the shake amount can be accurately detected using the images in this high contrast portion.

The X-direction contrast value Cx(I) is obtained by comparing the reference image stored in the reference memory 314a with an image obtained by shifting the reference image stored in the comparison memory 314b by one pixel and by adding density differences (absolute values) in the respective pixel positions. The larger a density change of the picked image in X-direction, the larger the contrast value Cx. Accordingly, the contrast value Cx(I) is calculated for the image G(I) in each block, and the blocks having large contrast values Cx(I) are selected. In this way, divided images of high contrast in X-direction are extracted.

The contrast value Cx(I) is calculated using an image $G_R$ first picked up at the start of the shake detection. Specifically, the image data picked up at the very beginning of the shake detection are stored in the reference memory 314a and the comparison memory 314b. Accordingly, the contrast value Cx is calculated by reading pixel data g(i, j) of the respective pixel positions (i, j) from the reference memory 314a and reading pixel data g(i, j+1) of positions (i, j+1) shifted by one pixel in X-direction from the pixel positions (i, j) from the comparison memory 314b, and by adding absolute values $|\Delta gx| = |g(i, j) - g(i, j+1)|$ of level differences $\Delta gx$ between the pixel data g(i, j) and g(i, j+1).

Similarly to the X-direction contrast value Cx, Y-direction contrast values Cy(I) are calculated for the divided images G(I) in the respective blocks to calculate the Y-direction contrast value Cy. The divided images having high contrast in Y-direction are extracted by selecting the blocks having large contrast values Cy(I).

The correlational value C is data used to calculate in which direction and to which degree an image $G_S$ after the elapse of a predetermined time t is shifted with respect to the image $G_R$ at the start of the shake detection, i.e., the shake direction and the shake amount of the picked image during the time t. The shift of the image $G_S$ with respect to the image $G_R$ is calculated by comparing the image $G_R$ with an image $G_{SS}$ obtained by shifting the image $G_S$ by a specified amount (e.g., one pixel) in X- and Y-directions and by deciding the image $G_{SS}$ which most coincides with the image $G_R$.

The correlational value C shows a degree of coincidence between the image $G_R$ and the respective images $G_{SS}$, and is defined as a sum of density differences (absolute values) in the respective pixel positions similar to the calculation of the contrast values Cx, Cy. As described above, the correlational value C is calculated only for m divided images G(r) (r=1, 2, . . . , m) having high contrast which were extracted from the picked image. Thus, if C(r) (r=1, 2, . . . , m) denotes correlational values calculated for the respective divided images, the correlational value C is calculated: C=C(1)+C(2)+ . . . C(m).

If C(k, h) denotes correlational values C for the image $G_{SS}$ which is shifted by k pixels in X-direction and by h pixels in Y-direction and k=h=0, ±1, ±2, there can be obtained 25 correlational values C(k, h). C(0, 0) is a correlational value when the images $G_R$ and $G_S$ are compared. If there is no camera shake, the images $G_S$ and $G_R$ are same and, therefore, C(0, 0)=0.

On the other hand, if C(k, h)=0, the image $G_{SS}$ obtained by shifting the image $G_S$ by k pixels in X-direction and by h pixels in Y-direction is the same as the image $G_R$. Accordingly, assuming that Px, and Py denote pixels in X- and Y-directions, respectively, the image $G_{SS}$ is obliquely shifted from the image $G_R$ by P $(=(Px^2+Py^2)^{1/2})$ due to a camera shake.

The direction and the amount of the camera shake are calculated by calculating 25 correlational values C(k, h) (k=h=0, ±1, ±2) for the image $G_S$ and by obtaining a shift position where the correlational value C(k, h) is at minimum. In this case, if the minimum correlational value C(k, h) is assumed to be obtained in an intermediate position between pixels, this position is calculated by interpolation and an accurate shake amount ( $\xi x, \xi y$) is calculated based on the thus calculated value.

The calculating circuit 315 is provided with a subtracting circuit 315a, an absolute value circuit 315b, an adding circuit 315c and a register 315d for calculating the contrast values Cx(I), Cy(I) and the correlational values C(k, h). The subtracting circuit 315a calculates the level differences $\Delta gx=g(i, j)-g(i, j+1)$ between the pixel data g(i, j) of the reference image and the pixel data g(i, j+1) of the comparison image in the calculation of the contrast values Cx(I) and the level differences $\Delta gy=g(i+1, j) - g(i, j)$ between the pixel data g (i, g) of the reference image and the pixel data g(i+1, j) of the comparison image in the calculation of the contrast values Cy(I). In the calculation of the correlational values C(k, h), the subtracting circuit 315a calculates the level differences $\Delta g=g(i+k, j+h)-g(i, j)$ between the pixel data g(i, j) of the reference image $G_R$ and pixel data g(i+k, j+h) of the image $G_{SS}$ obtained by shifting the comparison image $G_S$ by k pixels in X-direction and by h pixels in Y-direction.

The absolute value circuit 315b calculates the absolute values of the level differences $\Delta gx$, $\Delta gy$, $\Delta g$. The adding circuit 315c and the register 315d add the absolute values of $\Delta gx$, $\Delta gy$, $\Delta g$ in the respective pixel positions to calculate the contrast values Cx(I), Cy(I) and the correlational values C(k, h).

The memory 316 stores the X- and Y-direction contrast values Cx(I), Cy(I) and the correlational values C(k, h) calculated in the calculating circuit 315.

The shake amount calculator 31C reads the X- and Y-direction contrast values Cx(I), Cy(I) from the memory 316 and extracts the divided images to calculate the correlational values. The shake amount calculator 31C also applies interpolation to the calculated correlational values C(k, h) for the respective extracted divided images to obtain the shift position (x-coordinate $\xi x$, y-coordinate $\xi y$) where the correlational value C(k, h) is at minimum, thereby calculating a shake direction and a shake amount. These pieces of information (shake direction and shake amount) concerning the camera shake are inputted to the controller 20.

Referring back to FIG. 4, the shake correction lens 32 is adapted to correct the shake in X-direction, and the shake correction lens 33 is adapted to correct the shake in Y-direction. The shake correction motor control circuit 34 controls the driving of a motor 341 for driving the shake correction lens 32, and the shake correction motor control circuit 35 controls the driving of a motor 351 for driving the shake correction lens 33.

Figure 7:
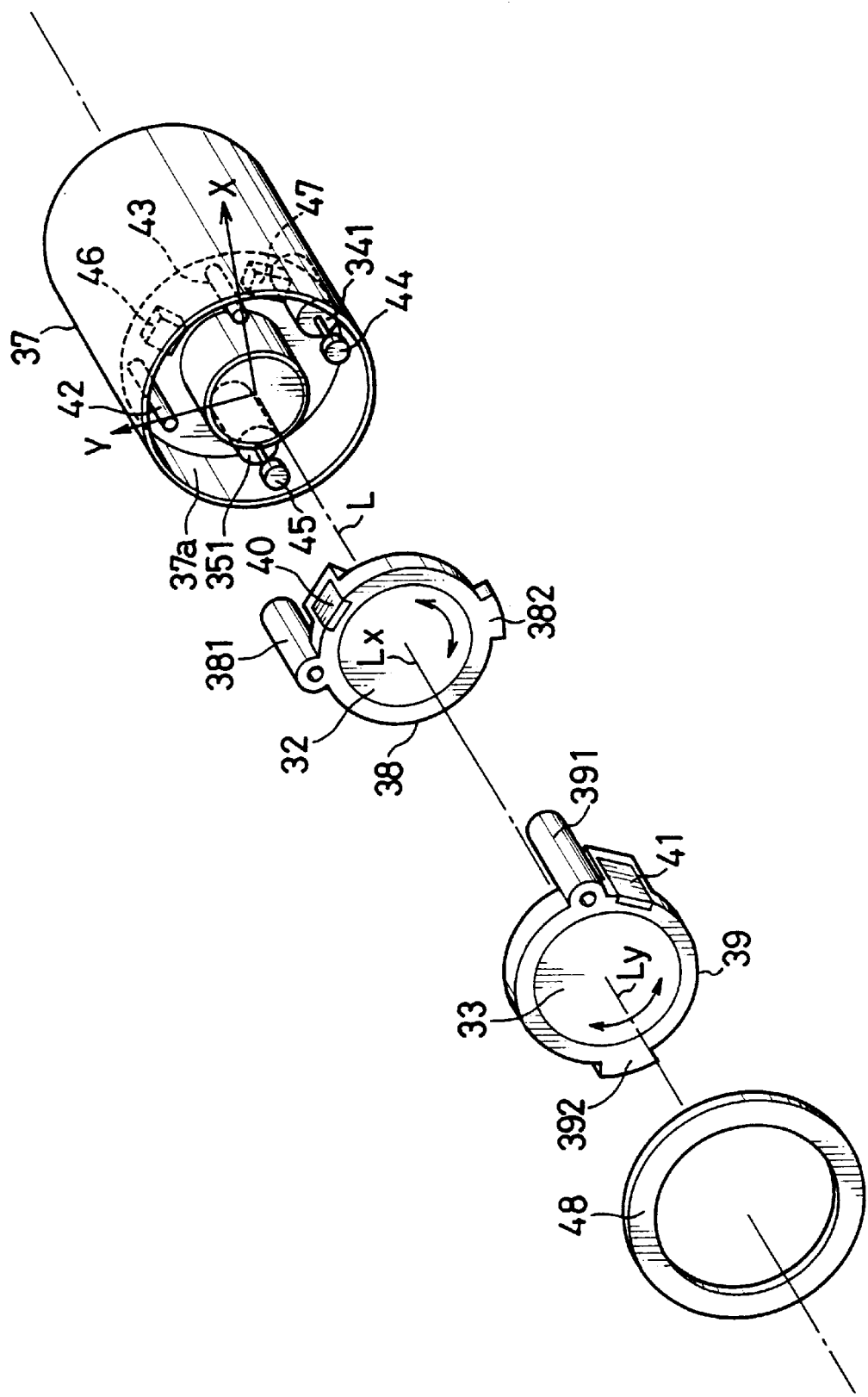
FIG. 7 is an exploded perspective view showing a construction of an optical system used for shake correction.

FIG. 7 is an exploded perspective view showing a construction of the shake correcting optical system.

The shake correcting optical system is provided at the leading end of the taking lens 3. At the leading end of a lens holder 37 of the taking lens 3 is formed an annular recess 37a, in which the X-direction and Y-direction shake correction lenses 32, 33 are movably provided along an X-axis direction (horizontal direction of the camera main body 2) and a Y-axis direction (vertical direction of the camera main body 2) on a plane normal to an optical axis L, respectively.

The X-direction shake correction lens 32 is provided with a cylindrical pin hole 381 and a tooth 382 on its periphery which are opposed to each other, and the lens is held by an annular holding frame 38 includes a light emitting element 40 provided in vicinity of the pin hole 381 for detecting the position of the lens. The Y-direction shake correction lens 33 is also held by a holding frame 39 having the same construction as the holding frame 38.

Assuming XY coordinate systems having the optical axis L as an origin in the recess 37a as shown in FIG. 7, a pin 42 projects in a specified position on a (+) Y-axis in the recess 37a. This pin 42 is fitted into the pin hole 381 of the holding frame 38, so that the X-direction shake correction lens 32 is so mounted in the recess 37a as to be displaceable along the X-axis direction. Further, a pin 43 projects in a specified position on a (+) X-axis in the recess 37a. This pin 43 is fitted into a pin hole 391 of the holding frame 39, so that the Y-direction shake correction lens 33 is so mounted in the recess 37a as to be displaceable along the Y-axis direction.

Inside the lens holder 37, the motor 341 having a drive gear 44 secured to its drive shaft is provided in a specified position on a (−) Y-axis in the recess 37a. This drive gear 44 is in mesh with the tooth 382 of the holding frame 38. Further, the motor 351 having a drive gear 45 secured to its drive shaft is provided in a specified position on a (−) X-axis in the recess 37a. This drive gear 45 is in mesh with a tooth 392 of the holding frame 39. In a position of the bottom surface of the recess 37a facing the light emitting element 40 of the shake correction lens 32 is provided a light receiving element 46. A light receiving element 47 is provided in a position facing a light emitting element 41 of the shake correction lens 33.

The shake correction lenses 32, 33 are so mounted in the recess 37 with the shake correction lens 32 located inside the shake correction lens 33 as to be displaceable along X- and Y-directions, respectively, and are fixed by a pressing ring 48 so as not to come out of the recess 37.

In the above construction, if the motor 341 is driven in a forward or reverse direction, the shake correction lens 32 rotates clockwise or counterclockwise by a very small angle about the pin 42, with the result that an optical axis Lx of the shake correction lens 32 is displaced in ±X-directions along the X-axis with respect to the optical axis L to perform the shake correction in the X-direction. A stripe patterned light image is projected toward the light receiving element 46 by the light emitting element 40, position information (e.g., a displacement from a reference position) of the shake correction lens 32 is detected based on a receiving position of the stripe patterned light image in the light receiving element 46. This position information is fed back to the shake correction motor control circuit 34 of the motor 341, thereby accurately controlling the displacement of the shake correction lens 32.

Similarly, if the motor 351 is driven in a forward or reverse direction, the shake correction lens 33 rotates clockwise or counterclockwise by a very small angle about the pin 43, with the result that an optical axis Ly of the shake correction lens 33 is displaced in ±Y-directions along the Y-axis with respect to the optical axis L to perform the shake correction in the Y-direction. A stripe patterned light image is projected toward the light receiving element 47 by the light emitting element 41, a position information of the shake correction lens 33 is detected based on a receiving position of the stripe patterned light image in the light receiving element 47. This position information is fed back to the shake correction motor control circuit 35 of the motor 351, thereby accurately controlling the displacement of the shake correction lens 33.

Referring back to FIG. 4, the display control circuit 36 controls a display of the display portion 361 (see FIG. 3) provided inside the viewfinder. The display control circuit 36 makes a specified display in the display area A2 of the display portion 361 in accordance with the control signal and display data including information as to whether or not the shake correction is to be performed and information as to whether or not the shake correction can be performed which are inputted from the controller 20.

A switch $S_{FL}$ detects the operation of the operation button 12 for setting the flash firing mode, a switch $S_A$ detects the operation of the shake memory mode setting button 13, and a switch $S_B$ detects the operation of the shake correction mode setting button 9. The switch S1 and the switch S2 detect partly and fully pressed states of the shutter release button 8. The detection signals of the switches $S_{FL}$, $S_A$, $S_B$, S1, and S2 are inputted to the controller 20.

Next, the shake correcting method by the shake correction lenses 32, 33 and the shake amount of the object light image after the shake correction are described.

First, the correction of a shake caused by usual camera shake of a hand holding the camera main body 2 (hereinafter, "usual camera shake") is described. It should be noted that description is given on the X-direction shake correction for the sake of convenience.

Figure 8:
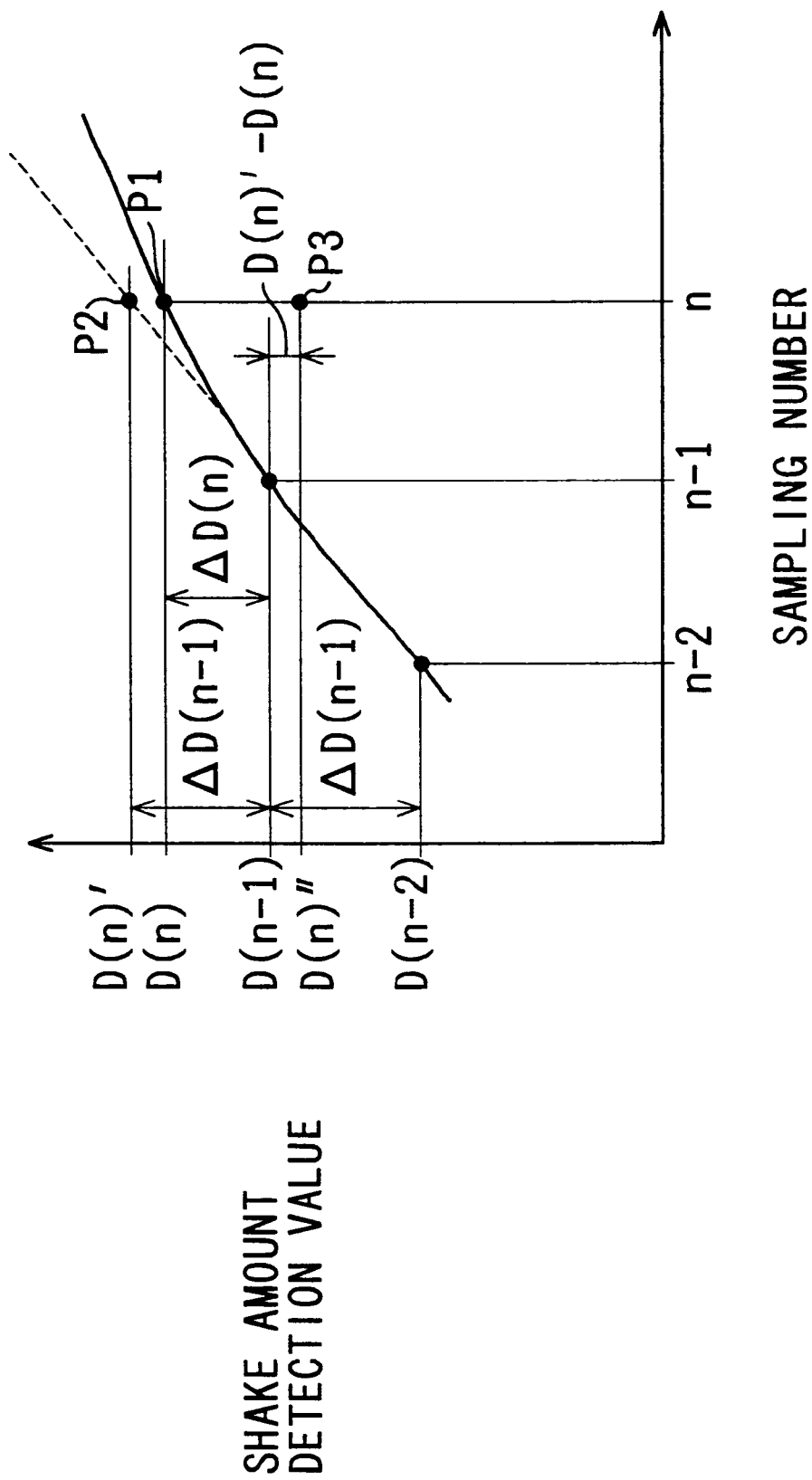
FIG. 8 is a graph showing a basic principle of optically reducing the shake of an object light image on an exposure plane.

FIG. 8 is a graph showing a detected X-direction shake amount of the object light image on the exposure plane. In FIG. 8, a horizontal axis represents a sampling number n, whereas a vertical axis represents a detected value of the shake amount D(n).

A basic principle of optically reducing the shake of the object light image on the exposure plane is as follows. Assuming that the n-th shake amount detection value D(n) is a value D(n)' varied from the detected shake amount D(n-1) by a difference $\Delta D(n-1)(=D(n-1)-D(n-2))$ between the (n-2)th shake amount detection value D(n-2) and the (n-1)th shake amount detection value D(n-1), a difference $\Delta D(n)$ between the n-th shake amount detection value and the (n-1)th shake amount detection value D(n-1) is made smaller by performing such shake correction as to change the focusing position of the object light image on the exposure plane by $-\Delta D(n-1)$ during the (n-1)th shake amount detection.

In FIG. 8, P1 denotes the n-th shake amount detection value D(n) when no shake correction is performed, and P2 is a predicted detected shake amount D(n)' which is assumed at the time of the (n-1)th shake amount detection. If D(n)'=D(n), a detected shake amount D(n)" which is predicted as the n-th detected value is D(n-1) if the shake correction $-\Delta\Delta D(n-1)$ is made during the (n-1)th correction. Thus, no error occurs. However, normally, the n-th shake amount detection value D(n) does not agree with D(n)'. If D(n)'>D(n) as shown in FIG. 8, a predicted shake amount D(n)" in the n-th correction after the shake correction is P3 and its error is (D(n)'-D(n)).

Figure 9:
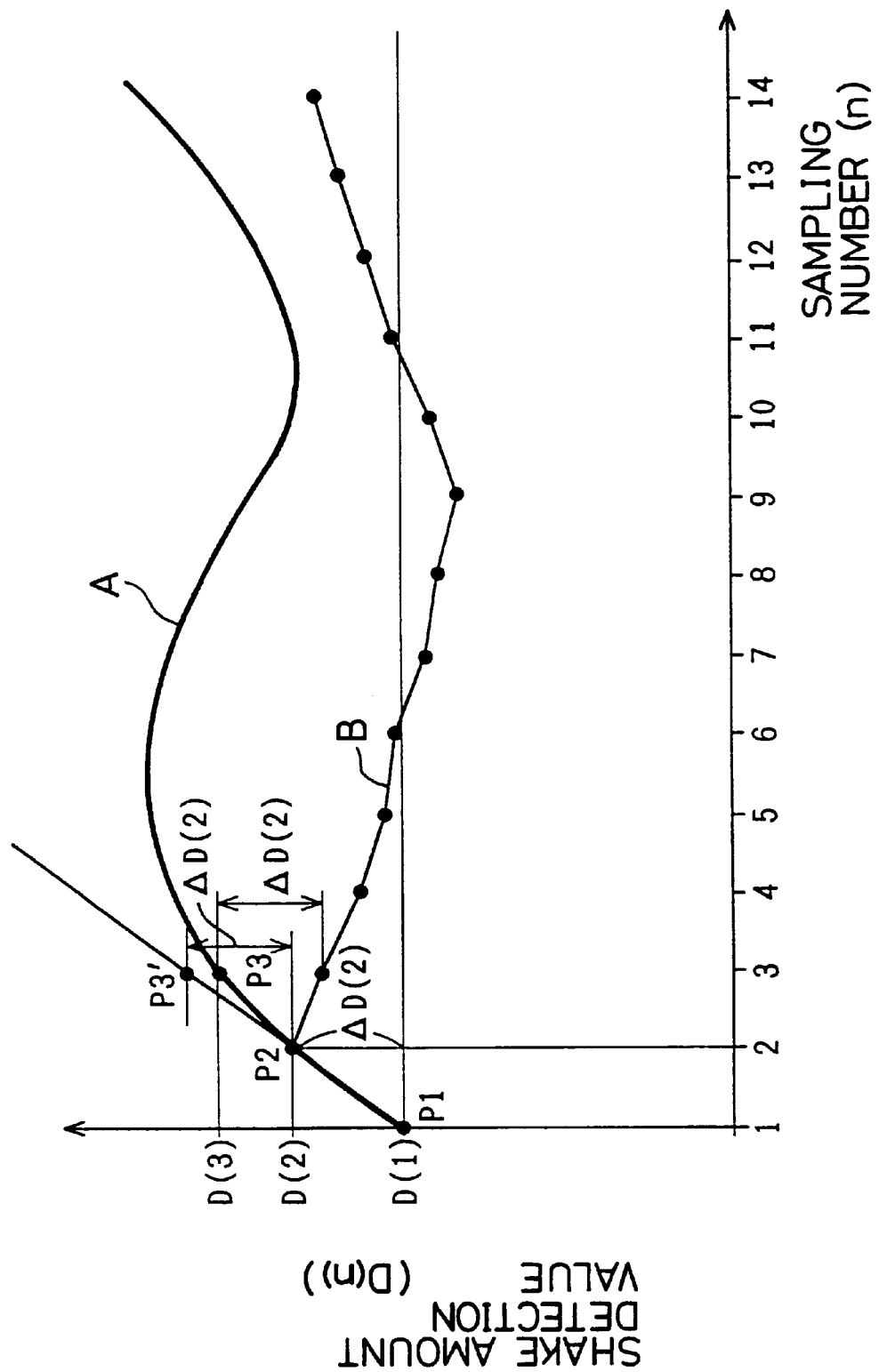
FIG. 9 is a graph showing a shake amount detection value (prediction value) when shake correction is performed based on the shake correction principle.

FIG. 9 is a graph showing a detected shake amount (prediction value) when the shake correction is performed based on the above principle of shake correction.

In FIG. 9, a curve A is a wave of the shake of the object light image when the shake correction is not performed and a curve B is a wave of the shake of the object light image which is presumed when the shake correction is performed.

The shake amount detected by the shake amount detecting circuit 31 is detected using the object light image on the sensing surface of the CCD area sensor 311 to which no shake correction is optically applied. Accordingly, even when the shake correction is performed by the taking lens 3, the detected shake amount is equal to the one obtained when the shake correction is not performed. Thus, the curve A shows the shake amount D(n) detected by the shake amount detecting circuit 31.

On the other hand, since the shake amount of the object light image after the shake correction cannot be actually measured, the curve B is obtained by calculating the shake amount predicted when the shake correction is performed based on the principle of shake correction. The curve B shows the case where the shake correction is performed from the second shake amount detection, i.e. a case where the shake correction is so applied as to cancel the difference $\Delta D(n-1)$ in the (n-1)th shake amount detection and this difference $\Delta D(n-1)$ is assumed to be accurately corrected.

As shown in FIG. 8, a shake wave presumed when the shake correction is performed is a wave of a differential coefficient of the curve A which varies about a position where the shake correction is started.

In the case that the shake of the object light image is optically corrected, there is a loss due to a response characteristic of the shake correction lenses 32, 33. Accordingly, if the difference $\Delta D(n-1)$ is inputted as a shake correction control value F(n) to the shake correction motor control circuits 34, 35 of the motors 341, 351, the shake amount of the object light image to be actually corrected (hereinafter, "shake correction amount") F(n)' is smaller than $\Delta D(n-1)$. Thus, the shake wave after the shake correction is not actually as shown in the curve B of FIG. 9.

Since the above loss E(n) is generally proportional to a square of the shake correction control value $\Delta D(n-1)$ inputted, if $E(n)=\Delta(n-1)^2/\alpha$ ($\alpha$: coefficient), the actual shake correction amount F(n)' is:

$$F(n)' = F(n) - E(n)$$
$$= \Delta D(n-1) - \Delta D(n-1)^2/\alpha.$$

Accordingly, the shake correction control value F(n) needs to be set in consideration of the loss E(n) in order to make a difference between F(n)' and $\Delta D(n-1)$ as small as possible. If the shake correction control value F(n) is set by adding a product of the loss E(n) and k to the difference $\Delta D(n-1)$, the shake correction amount F(n)' is defined as in following Equation (1).

$$F(n)'=F(n)-F(n)^2/\alpha \quad (1)$$

where $$F(n)=\Delta D(n-1)+k\cdot\Delta D(n-1)^2/\alpha \quad (2)$$

In Equation (1), the second term is the loss. Further, the coefficient $\alpha$ is peculiar to a shake correcting mechanism provided in the camera 1, and a suitable value is set through experiments or the like. Further, the coefficient k is a coefficient to determine a feedback amount for compensating for a mechanical loss. The coefficient k is normally set smaller than 1 so as to avoid an excessive shake correction amount when the amplitude of the shake suddenly becomes smaller.

The shake correction control value F(n) is calculated for each sampling. If the shake correction is performed using this shake correction amount F(n), the n-th shake amount detection value D(n)" is assumed to be an error between the detected shake amount D(n) when no shake correction is performed and an integral value S(n) (=F(2)'+F(3)'. . . +F(n−1)'+F(n)'=S(n−1)+F(n)') of the shake correction amounts up to the n-th detection. Thus, the n-th shake amount detection value D(n)" is calculated in accordance with Equation (3):

$$D(n)"=D(n)-\{F(n)'+S(n-1)\} \quad (3)$$

Figure 10:
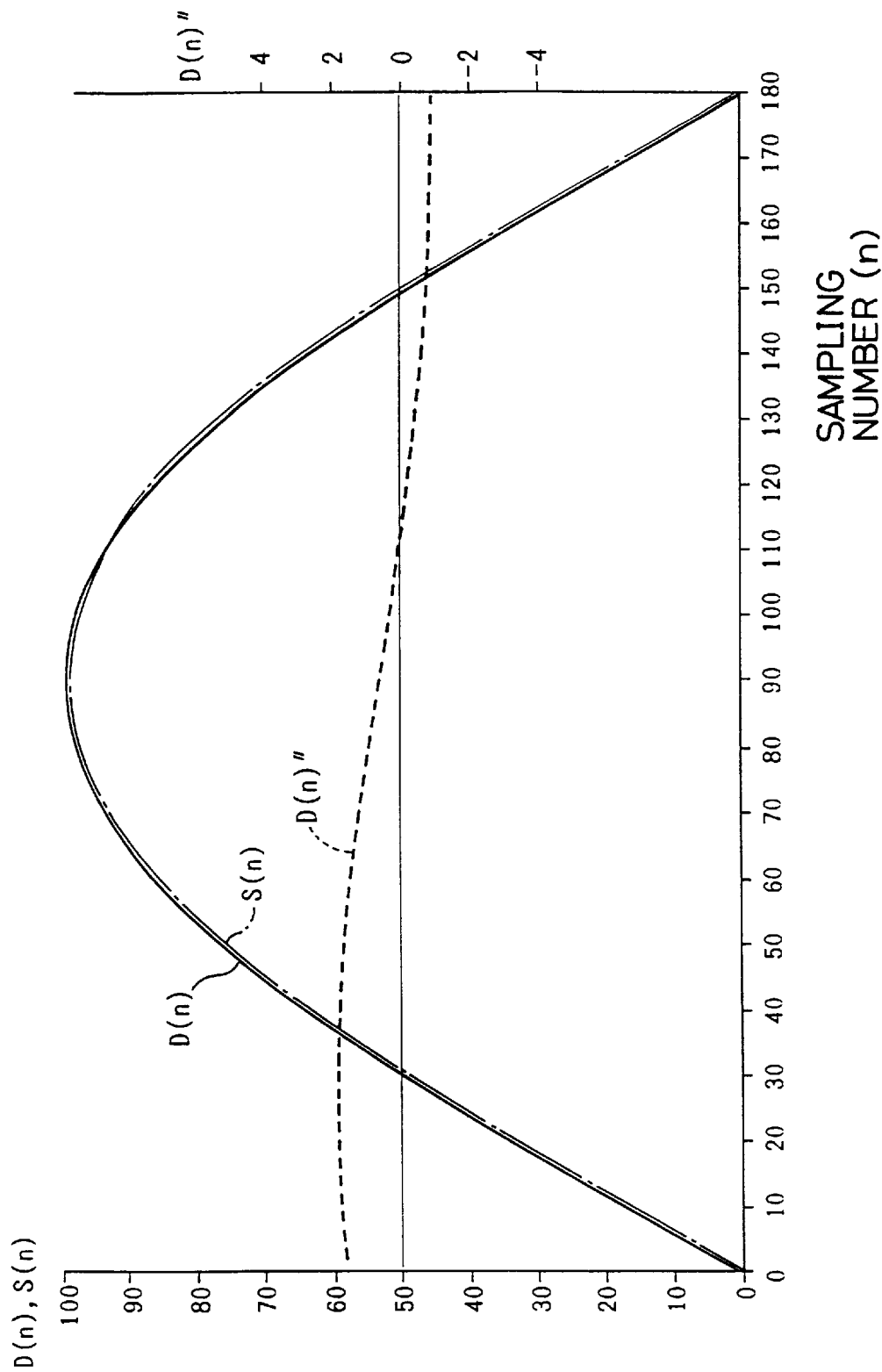
FIG. 10 is a graph showing simulation results of prediction values of shake correction amounts in a usual camera shake.

FIG. 10 is a graph showing simulation results of prediction values of the shake correction amount after the shake correction calculated in the above method.

In FIG. 10, the shake wave of the object light image due to a camera shake is a sine wave, and the shake amount detection value D(n) when no shake correction is performed is: D(n)=100·sin(n). Further, simulation is performed with K=0.8, α=50 and sampling cycle of 1°. A solid line curve shows the shake amount detection value D(n) when no shake correction is performed; a phantom line curve shows the shake correction amount integral value S(n); and a dotted line curve shows the shake amount detection value (prediction value) D(n)" after the shake correction (hereinafter, the predicted shake amount detection value after the shake correction is referred to as a shake correction prediction value). The shake wave is made into a sine wave, taking it into consideration that the shake wave during a very short exposure time can be approximated to a sine wave.

As shown in FIG. 10, when the shake wave can be approximated to a sine wave, the optical shake correction can be relatively properly performed. Accordingly, in the case of the usual camera shake, the shake of the object light image can be effectively reduced by suitably adjusting the coefficient k so long as no sudden and drastic shake occurs.

Next, there is described a correction for the shake which occurs at the time of a shutter release operation in which a shutter release is instructed by fully pressing the shutter release button 8.

If a camera shake which occurs during a time which lasts until the exposure is completed after the shutter release button 8 is fully pressed is observed, a sudden shake (shake having a high frequency wave of large amplitude) momentarily occurs when the shutter release button 8 is fully pressed and, then, subsides to a usual camera shake. The wave of the shake which occurs immediately after the shutter release button 8 is operated is such that a wave of a shake caused only by the operation of the shutter release button 8 is superimposed onto the wave of the usual camera shake, in other words contains shake components of the usual camera shake and those of the release camera shake.

In the usual camera shake, the shake wave of the object light image barely largely changes within a very short exposure time, and there is a small variation between photographing operations. Accordingly, the shake correction can be relatively satisfactorily performed by driving the shake correction lenses 32, 33 based on the shake correction control value F(n) calculated by the above Equation (2).

However, in the release camera shake, the wave has a larger amplitude than that of the usual camera shake and suddenly and drastically changes. Thus, it is difficult to obtain a sufficiently satisfactory shake correction even if the shake correction is performed for the camera shake which occurs immediately after the operation of the shutter release button 8, using the shake correction control value F(n) set for the usual camera shake.

Figure 11:
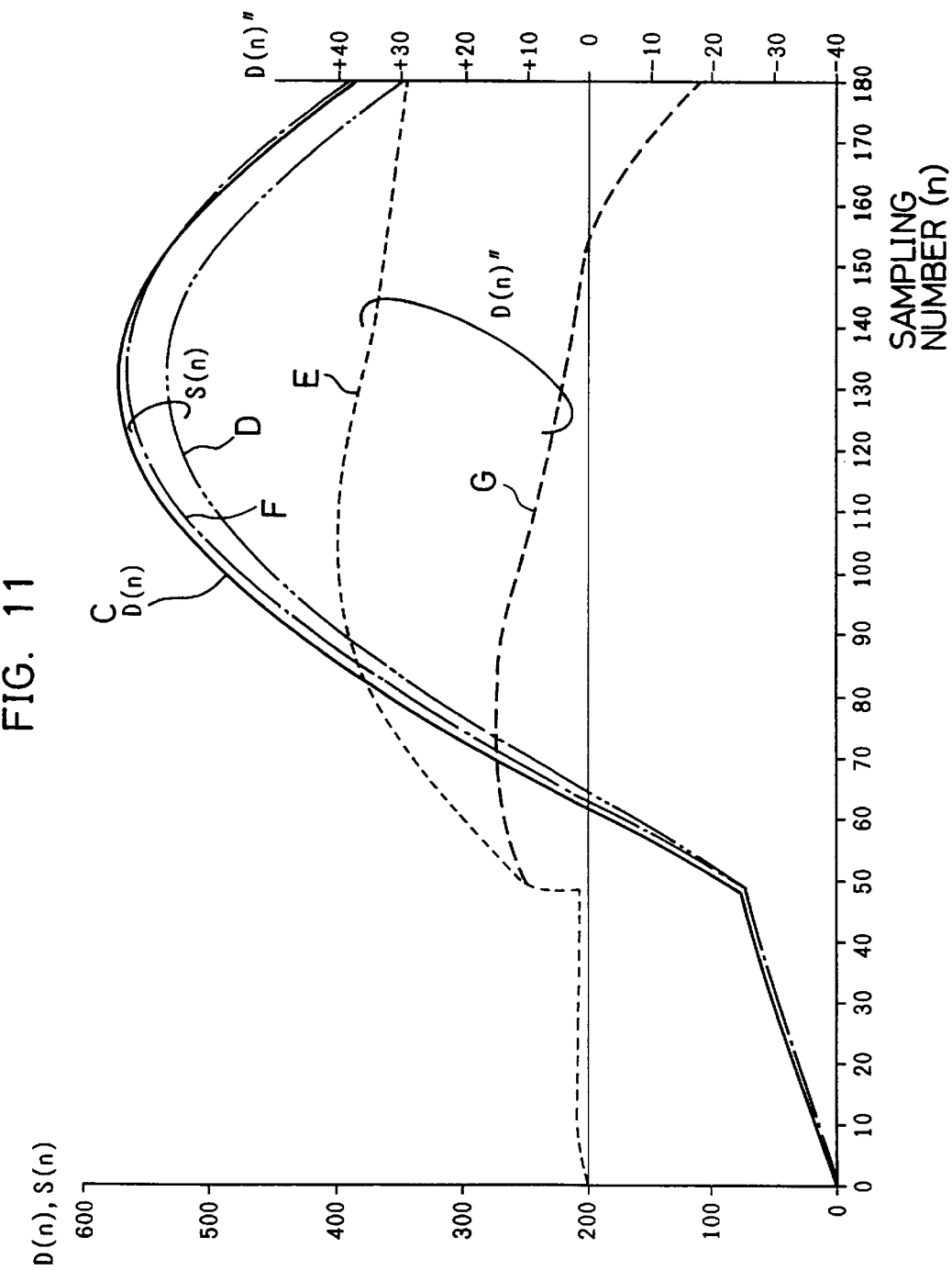
FIG. 11 is a graph showing simulation results of prediction values of shake correction amounts in a release camera shake caused by shutter release operation.

FIG. 11 is a graph showing simulation results of prediction values of the shake correction amount in the release camera shake.

The shake wave immediately after the operation of the shutter release button 8 is a wave obtained by superimposing the wave of the release camera shake onto the wave of the usual camera shake. In FIG. 11, the wave of the usual camera shake is 100·sin(n), that of the release camera shake is 500·sin(4n), and an overall shake wave C is a superimposition of 500·sin(4n) onto sin(n) with a phase shift of n=50.

A curve D is the shake correction amount integral value S(n) calculated by Equation (2) with k=0.8 and α=50. A curve E is the shake correction prediction value D(n)" calculated by Equation (3) using the shake correction amount integral value S(n). Further, a curve F is the shake correction amount integral value S(n) calculated by Equation (2) with k=1.5 and α=50. A curve G is the shake correction prediction value D(n)" calculated by Equation (3) using this shake correction amount integral value S(n).

As shown in the curves D, E of FIG. 11, the shake correction for the usual camera shake is performed in a range of 0≦n≦50. Accordingly, the shake correction prediction value D(n)" after the shake correction is smaller than 2. In a range of 50<n, the release camera shake is superimposed. Since the shake correction control value F(n) is insufficient for the release camera shake, the shake correction prediction value D(n)" after the shake correction becomes worse to 10 to 40 (i.e., several times to several tens of times). From this, the optical shake correction is seen to be difficult.

The reason why the optical shake correction is difficult when the release camera shake is superimposed is as follows. A correction addition amount H(n)=k·ΔD(n−1)²/α for compensating for a mechanical loss in Equation (2) is relatively small as compared to an increase of the shake amount caused by the release camera shake and, accordingly, an effective response to the shake correction cannot be obtained. In other words, the coefficient k for determining the correction addition amount H(n) is improper for the shake wave in which the release camera shake is superimposed, making the shake correction control value F(n) for this shake wave insufficient.

The coefficient k is set for the wave of the usual camera shake and set equal to or smaller than 1 in order to avoid an excessive correction in the case of a small shake. Thus, if the wave of the sudden release camera shake having an amplitude several times as large as that of the wave of the usual camera shake is superimposed on the wave of the usual camera shake, the shake correction control value F(n) which is set without considering the shake components of the release camera shake is naturally insufficient.

In such a case, the wave of the release camera shake always has an amplitude larger than that of the usual camera shake. Accordingly, upon the occurrence of the release camera shake, the shake correction control value F(n) may be improved by changing the coefficient k to a suitable value which is larger than the value for the usual camera shake as shown in the curves F, G of FIG. 11. In FIG. 11, when the release camera shake occurs, the maximum value of the shake correction prediction value D(n)41 at the (+) side is reduced to about 15 from about 40 by increasing the coefficient k from 0.8 to 1.5.

However, according to a method for increasing the coefficient k upon the occurrence of the release camera shake, the shake amount can be effectively suppressed for the shake wave which suddenly increases immediately after the occurrence of the release camera shake (i.e. for the shake wave of 50<n<150), but the shake correction prediction value D(n)" suddenly decreases to the (−) side for a part of the shake wave where the shake amount decreases (i.e. 150<n). Thus, an increase of the coefficient k leads to a problem.

In order to avoid such a problem, it is preferable to perform the shake correction for the shake component of the usual camera shake and that of the release camera shake because the shake at the time of the occurrence of the release camera shake is a composition of the shake component of the usual camera shake and that of the release camera shake. In other words, it is preferable that a shake correction control value F1(n) for the wave of the usual camera shake and a shake correction control value F2(n) for the wave of the release camera shake be calculated, and that the shake correction be performed using a sum of both shake correction control values F1(n), F2(n).

In this case, the aforementioned Equation (2) for the shake correction control value F(n) for the wave of the usual camera shake can be used to calculate the shake correction control value F2(n) for the wave of the release camera shake. The coefficient k of the correction addition amount H(n) needs to be set at a suitable value equal to or larger than 1 based on the wave of the release camera shake.

Figure 12:
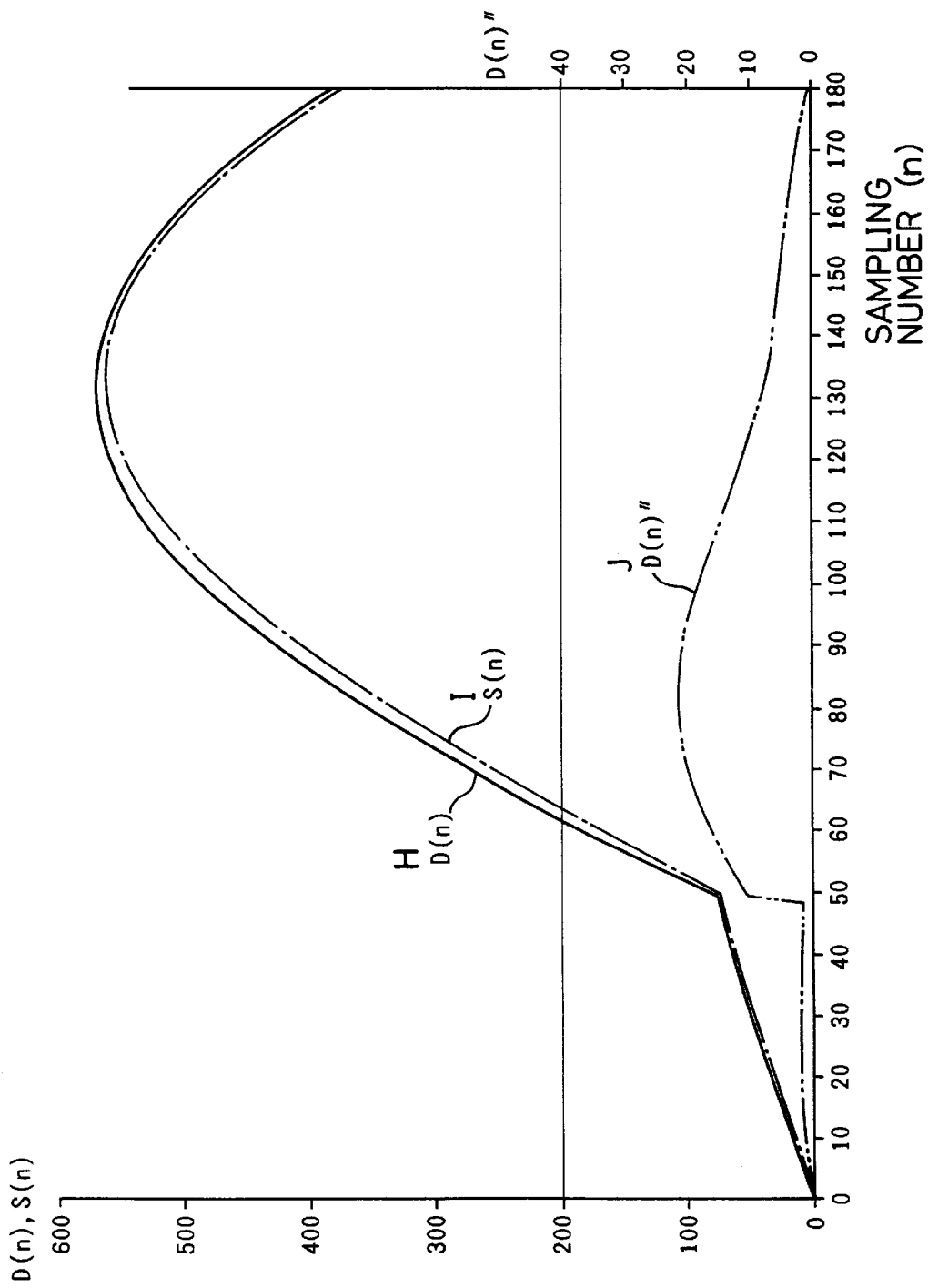
FIG. 12 is a graph showing simulation results of prediction values of shake correction amounts in the release camera shake when shake correction is performed for each shake component of a shake wave.

If a case where the shake correction control value F1(n) for the wave of the usual camera shake and the shake correction control value F2(n) for the wave of the release camera shake are calculated, and where the shake correction is performed using a sum of both shake correction control values F1(n), F2(n) is simulated for the example of the wave of the release camera shake shown in FIG. 11, what shown in FIG. 12 is obtained.

A curve H shown in FIG. 12 is the same shake wave as the curve C of FIG. 11. A curve I is a shake correction amount integral value S(n) when the shake correction control value F1(n) for the wave of the usual camera shake and the shake correction control value F2(n) for the wave of the release camera shake are calculated, and the shake correction is performed for each shake component using a sum of both shake correction control values F1(n), F2(n). A curve J is a shake correction prediction value D(n)" calculated using this shake correction amount integral value S(n).

The shake correction control value F1(n) and a shake correction amount F1(n)' for the shake component of the usual camera shake are given by Equations (4), (5) based on Equations (1), (2).

$$F1(n) = \Delta D1(n-1) + k1 \cdot \Delta D1(n-1)^2/\alpha \quad (4)$$

$$F1(n)' = F1(n) - F1(n)^2/\alpha \quad (5)$$

where k1=0.8

The shake correction control value F2(n) and a shake correction amount F2(n)' for the shake component of the release camera shake are given by Equations (6), (7).

$$F2(n) = \Delta D2(n-1) + k2 \cdot \Delta D2(n-1)^2/\alpha \quad (6)$$

$$F2(n)' = F2(n) - F2(n)^2/\alpha \quad (7)$$

where k2=1.5

When the release camera shake is superimposed, a shake correction amount F(n)' in a case where the shake correction is performed by changing the shake correction control value F(n) into a value G(n)=F1(n)+F2(n) which is a sum of the shake correction control values F1(n) and F2(n) is given by Equation (8) based on Equation (1).

$$F(n)' = G(n) - G(n)^2/\alpha \quad (8)$$

Accordingly, the shake correction prediction value D(n)" after the shake correction is given by Equation (9) based on Equation (3).

$$D(n)'' = D(n) - \{F(n)' + S(n-1)\} \quad (9)$$

where $$D(n) = D1(n) + D2(n)$$

$$F(n)' = G(n) - G(n)^2/\alpha$$

$$S(n-1) = F(2)' + F(3)' \ldots + F(n-1)'$$

By comparing the curve J of FIG. 12 with the curve G of FIG. 11, it can be seen that the shake amount suppression effect is slightly lower than the method for increasing only the coefficient k for a first part of the shake wave immediately after the occurrence of the release camera shake, but the shake correction prediction value D(n)" does not largely decrease to the (−) side as with the above method for a following part of the shake wave, thereby realizing a more suitable shake correction effect as a whole.

As described above, Equations for calculating the shake correction control values F1(n), F2(n) are set by determining suitable coefficients k1, k2 based on the characteristics of the waves of the usual camera shake and of the release camera shake. In addition, a shake amount data of the shake component of the release camera shake (i.e., release shake data) is stored. When the release camera shake occurs immediately after the operation of the shutter release button 8, this shake wave is separated into the shake component of the usual camera shake and that of the release camera shake, and the shake correction is performed for the respective shake components using the shake correction control values F1(n), F2(n). Accordingly, a proper shake correction can be immediately performed without waiting until the sudden release camera shake converges.

A standard shake wave of the release camera shake may be empirically obtained in advance (e.g., by averaging the shake components of a plurality of release camera shakes or by approximating the shake components of a plurality of release camera shakes to a typical wave) and may be stored in the memory 203. However, the shake component of the release camera shake differs from photographer to photographer. Thus, the release shake data obtained by actually operating the shutter release button 8 may be inputted to the shake correctable camera, and the shake correction control value F2(n) may be calculated based on this release shake data. Then, since the data of the shake correction control value F2(n) is so set as to conform to the wave of the release camera shake peculiar to the photographer, a more proper shake correction can be performed.

The shake correctable camera 1 in this embodiment has a shake memory mode, in which the release shake data can be stored.

Next, the release shake data storing method in the shake memory mode is described with reference to flowcharts of FIGS. 13 and 14.

Figure 13:
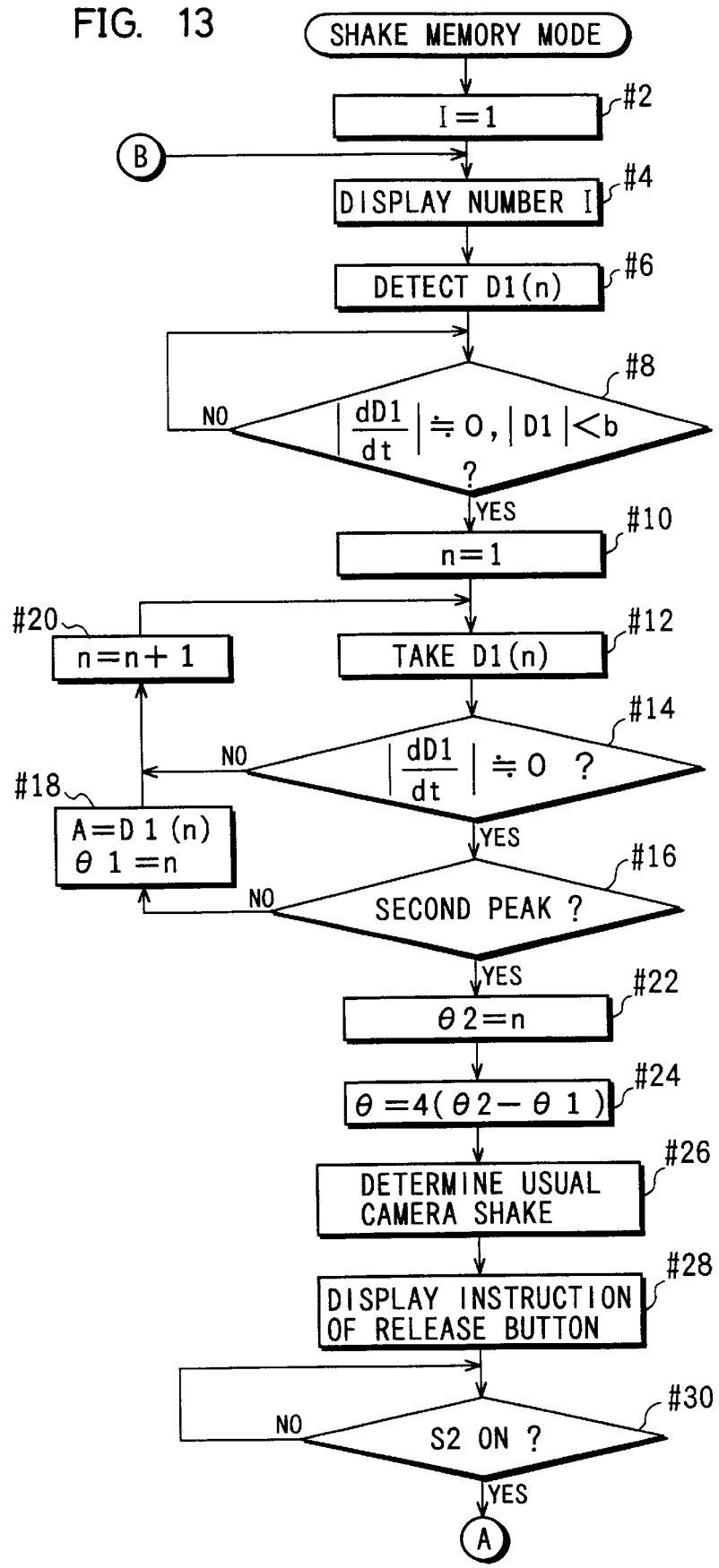
FIGS. 13 and 14 are flowcharts showing a control of reading data of the shake wave of the release camera shake in a release shake memory mode.
Figure 14:
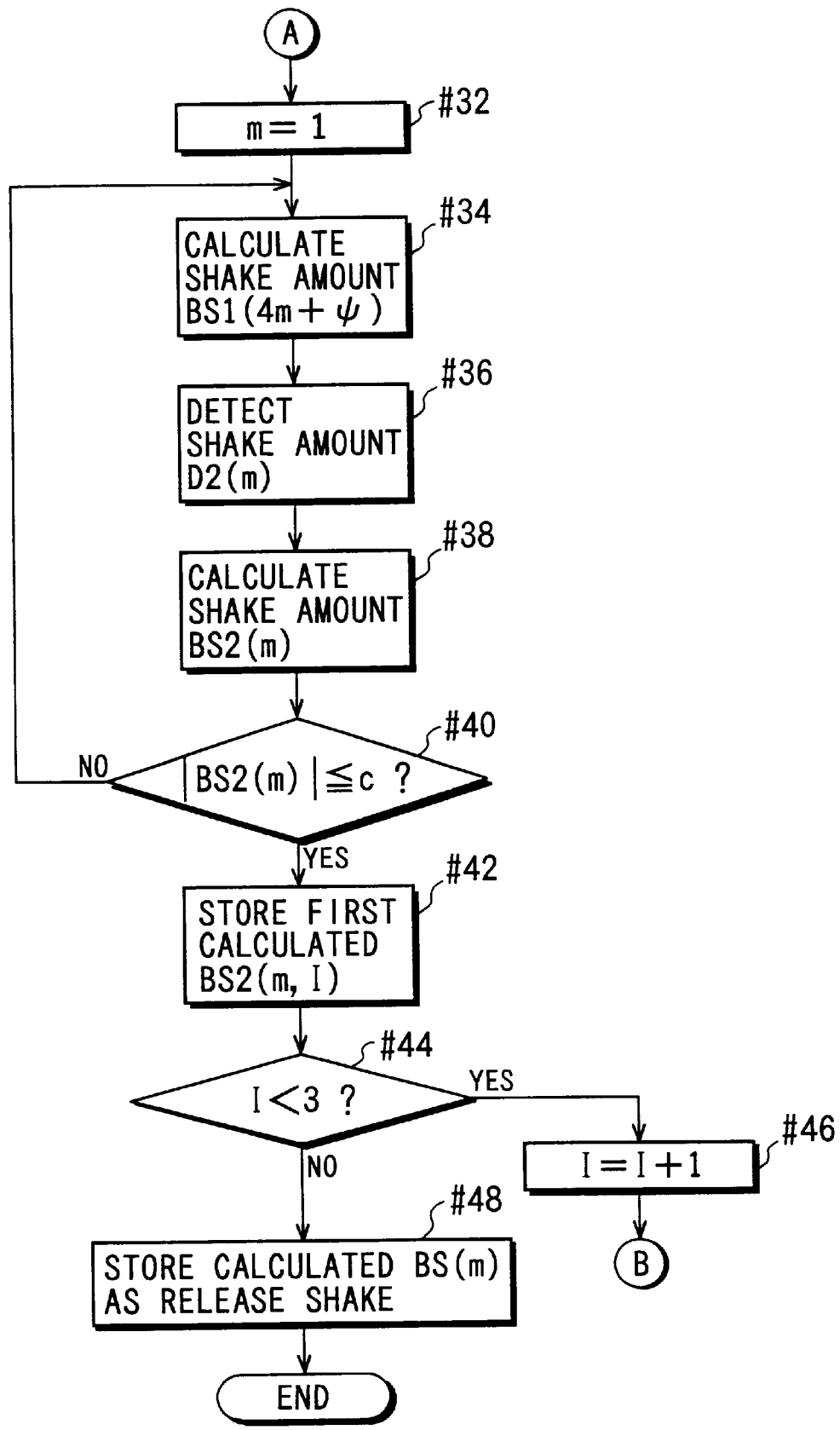

FIGS. 13 and 14 are flowcharts showing a release shake data storing control.

In the data storing control shown in FIGS. 13 and 14, the wave of the release camera shake is taken three time and an average value of these data is treated as a release shake data.

Further, the shake amount detection value D(n) detected by the shake amount detecting circuit 31 is such that the wave of the release camera shake is superimposed on that of the usual camera shake. Accordingly, the data D1(n) of the wave of the usual camera shake is first detected and then the data D(n) of a composite wave of the usual camera shake and the release camera shake immediately after the operation of the shutter release button 8 is detected. The data D2(n) of the wave of the release camera shake is detected by subtracting the data D1(n) of the wave of the usual camera shake from the data D(n).

When the shake memory mode is set, the routine shown in FIGS. 13 and 14 is executed. First, a count value I corresponding to the number of times the wave of the release camera shake is taken is set to "1" (Step #2), and the number I is displayed in the LCD device 11 (Step #4).

Subsequently, the detection of the shake amount D1(n) is started by the shake amount detecting circuit 31 in a predetermined cycle Δt (e.g. 1 ms) (Step #6). This shake amount D1(n) is a shake amount data of the wave of the usual camera shake since the shutter release button 8 has not yet been operated.

It is then discriminated whether the shake wave at the start of the detection of the shake amount D1(n) can be seen as a wave of the usual camera shake (i.e., can be approximated to a predetermined basic sine wave) (Step #8). If the shake wave comes to be seen as the wave of the usual camera shake (YES in Step #8), the taking of the data of the shake amount D1(n) of the wave of the usual camera shake is started (Step #10).

The reason why the detected shake amount D1(n) is not treated as the data of the wave of the usual camera shake from the beginning is to confirm that the shake wave at the start of the detection is the wave of the usual camera shake. The wave of the usual camera shake can be empirically approximated to a sine wave having an amplitude level within a specified range. Accordingly, when an absolute value |D1| of the shake amount D1(n) when a peak value of the detected shake amount D1(n), i.e., a rate of change δ=|dD1/dt| of the shake wave is substantially 0 is above a specified level b, the shake wave is presumed not to be the wave of the usual camera shake. Thus, the taking of the data of the shake amount D1(n) of the wave of the usual camera shake is started at the timing when the peak value |D1| becomes smaller than the specified level b.

Figure 15:
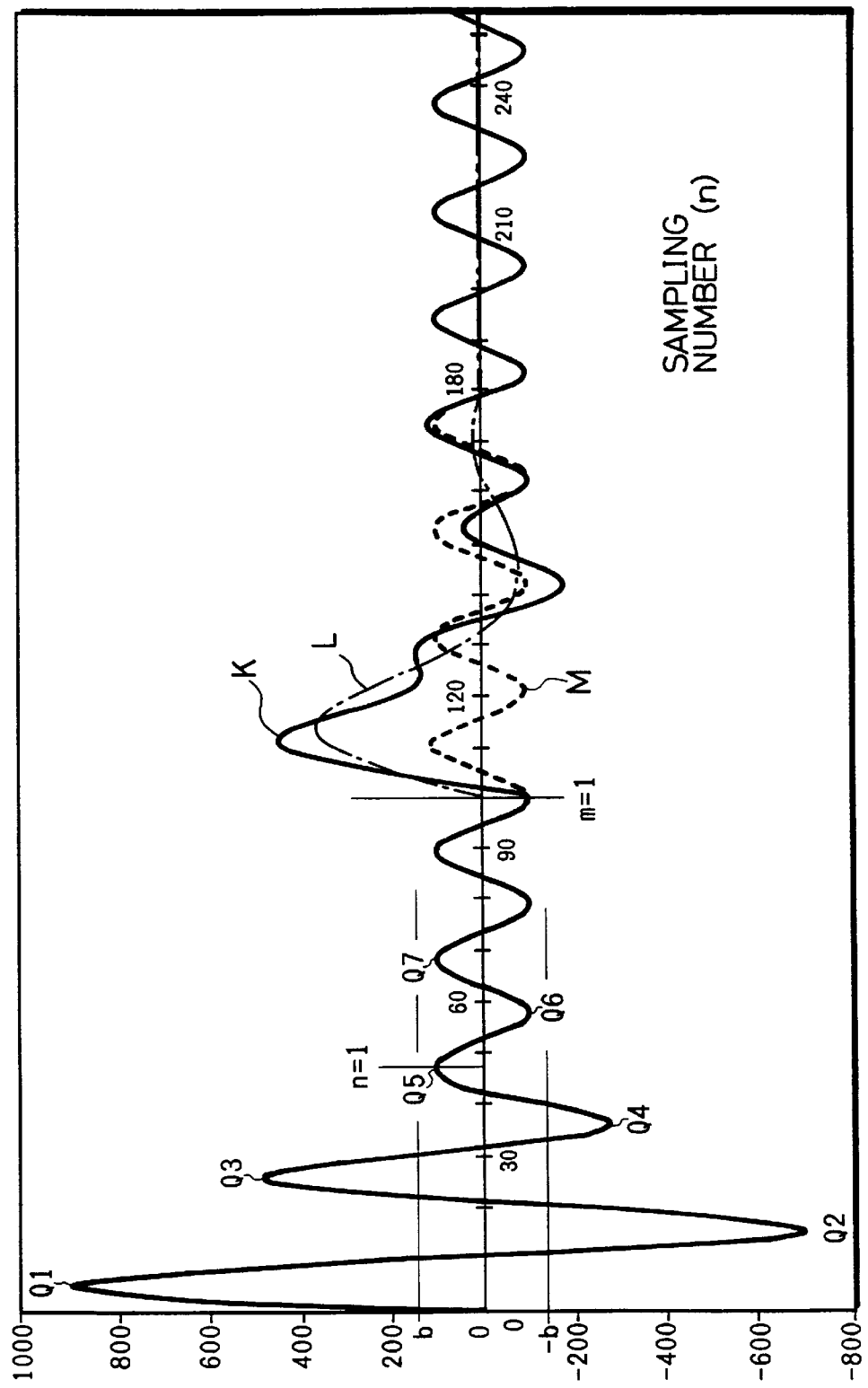
FIG. 15 is a diagram showing an exemplary wave representing a shake amount detected in the release shake memory mode.

Specifically, FIG. 15 shows a wave of shake amount detected in the shake memory mode. In FIG. 15, a horizontal axis represents a sampling number N and a vertical axis represents a detection level. If the detection of the shake amount D1(n) of Step #6 is assumed to be started with the sampling number N=0 in FIG. 15, peak points Q1, Q2, ... of the shake wave are detected using the successively detected shake amounts D1(n) and whether or not the amplitude at each peak point falls within a range of ±b is discriminated by the discrimination of Step #8. At the peak point Q5 where the peak value falls within the range of ±b, the taking of the data of the shake amount D1(n) of the wave of the usual camera shake is started.

In Step #10, a count value of the data taking sampling number n of the shake amount D1(n) is set at "1" and, thereafter, the shake amount D1(n) is taken in the specified cycle Δt (Steps #12 to #20). In this shake amount detection, the peak values of the shake wave are detected using the data of the successively detected shake amounts D1(n) (Step #14). Upon the detection of a first peak value (see Q6 of FIG. 15) (NO in Step #16), the sampling number n and the shake amount D1(n) at this time are stored as a phase θ1 and as an amplitude A of the wave of the usual camera shake, respectively (Step #18).

Upon the detection of a second peak value (see Q7 of FIG. 15) (YES in Step #16), the sampling number n at this time is stored as a phase θ2 (Step #18) and then a phase θ(=4(θ2−θ1)) of the wave of the usual camera shake is calculated based on the data of the phases θ1 and θ2 (Step #24).

Subsequently, a shake wave BS1 approximate to the sine wave of the usual camera shake is determined based on the amplitude A and the phase θ(Step #26). If q denotes a sampling number of a phase difference (θ2−θ1), the shake wave BS1 is: BS1(q)=Asin(θ)=D1(θ1)·sin(4 q).

A message instructing the full pressing of the shutter release button 8 is displayed on the LCD device 11 (Step #28). Instead of or in addition to the display on the LCD device 11, such an operation may be instructed by giving off buzzing sounds or the like.

Thereafter, when the switch S2 is turned on by the shutter release button 8 being fully pressed (YES in Step #30), a count value of data taking sampling number m of the shake amount D2(m) is set at "1" (Step #32), and a shake amount DB1(4m) at the count value m of the shake wave BS(q) of the usual camera shake determined in Step #26 is calculated (Step #34). This shake amount BS1(4m) is a prediction value of a shake component (see the wave M shown by dotted line in FIG. 15) of the usual camera shake included in the shake wave of the presently occurring release camera shake.

Subsequently, the shake amount D2(m) (see the wave K shown by solid line in FIG. 15) is detected by the shake amount detecting circuit 31 (Step #36). Further, a shake amount BS2(m)=D2(m)−BS1(4m+φ) (see the wave L shown by phantom line in FIG. 15) of the shake component of the release camera shake is calculated by subtracting the prediction value BS1(4m+φ) of the shake component of the usual camera shake from this shake amount detection value D2(m) (Step #38). The phase φ of the prediction value BS1(4 m+φ) of the shake component of the usual camera shake is, in FIG. 15, a phase of the shake wave BS1 at a count start point of the count value m.

The detection of the shake amount D2(m) of the composite wave of the usual camera shake wave and the release camera shake wave and the calculation of the shake amount BS2(m) of the shake component of the release camera shake based on the shake amount D2(m) and the prediction value BS1(4m) of the shake component of the usual camera shake are performed in the specific cycle Δt until the level |BS2(m)| of the shake component of the release camera shake becomes below a specified level c (a loop of Steps #34 to #40). If |BS2(m)|≦c (YES in Step #40), data of the first calculated shake amount BS2(m, 1) (m =1, 2, ... ) of the shake component of the release camera shake is stored (Step #42). It should be noted that "1" of the shake amount BS2(m, 1) indicates a first calculated value.

Subsequently, it is detected whether the count value I has become "3" (Step #44). If I<3 (YES in Step #44), the count value I is incremented by 1 (Step #46) and this routine returns to Step #4 to repeat the processing similar to the above to calculate data of a (I+1)th shake amount BS2(m, I+1) (m=1, 2, ... ) of the shake component of the release camera shake. Since I=1 at this time, this routine returns to Step #4 to calculate data of second and third shake amounts BS2(m, 2), BS2(m, 3) of the shake component of the release camera shake. Upon the completion of this processing (NO in Step #44), an average value BS(m) of the three shake amounts BS2(m, 1), BS2(m, 2), BS2(m, 3) of the shake component of the release camera shake is calculated: BS(m)={BS2(m, 1)+BS2(m, 2)+BS2(m, 3)}/3. After this calculation result BS(m) is stored as a release shake data in the memory 203 (Step #48), this routine ends.

Although the data of the shake amount BS2(m, I) of the shake component of the release camera shake is taken a plurality of times and an average values of these data is treated as the release shake data in this embodiment, the photographer may be allowed to select whether the data is taken a plurality of times or only once. With this arrangement, the release shake data can be quickly obtained by selecting the latter while being obtained with high accuracy by selecting the former. The photographer can select data taking method of the release shake data according to his intention.

Figure 16:
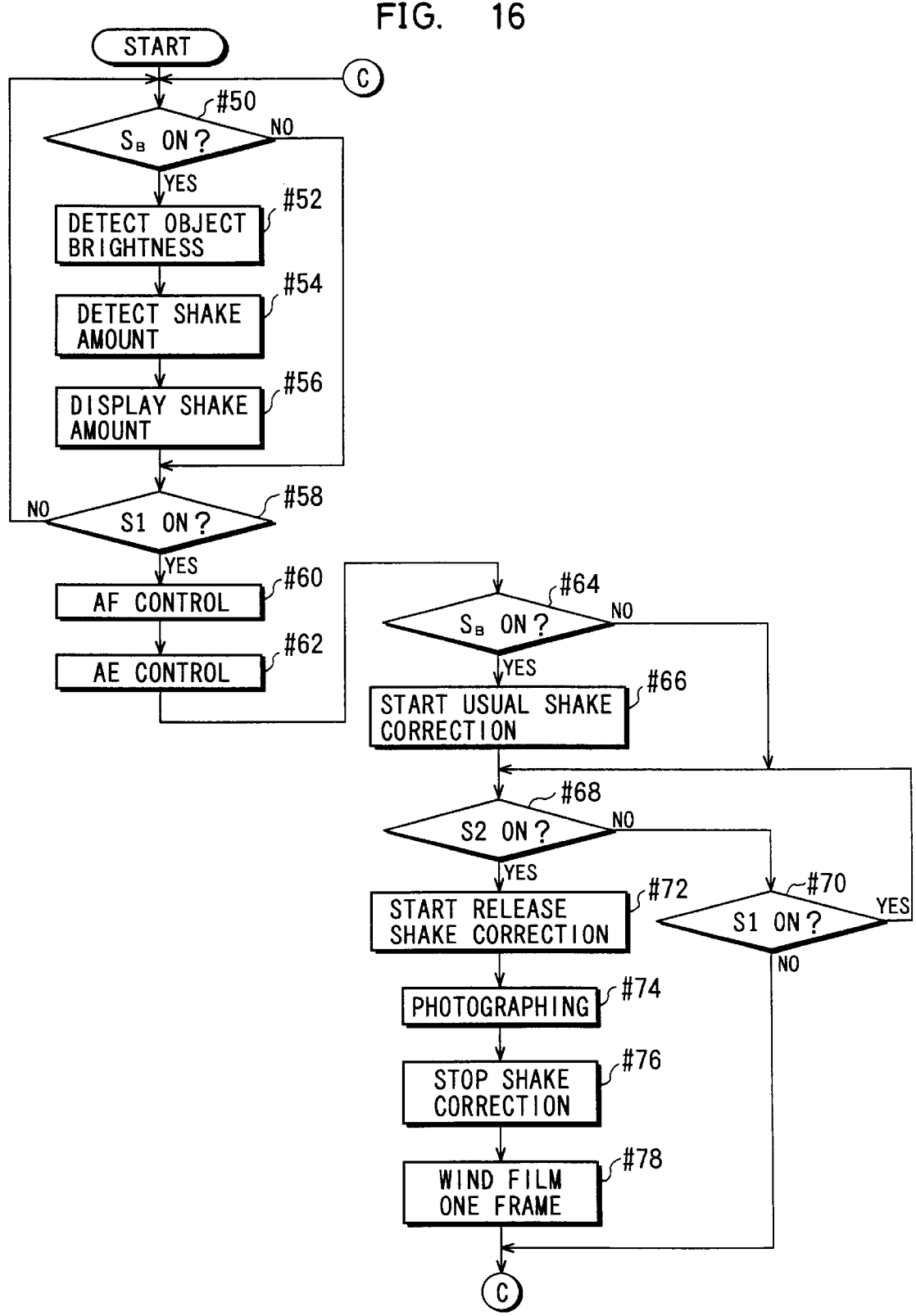
FIG. 16 is a flowchart showing a control of photographing of the shake correctable camera.

Next, a shake correction photographing control of the shake correctable camera is described with reference to a flowchart of FIG. 16.

When an unillustrated power switch $S_M$ is turned by pressing the main switch 14, thereby activating the camera 1, it is discriminated whether the shake correction mode has been set by the shake correction mode setting button 9 (Step #50).

If the shake correction mode is set (YES in Step #50), an object brightness is detected by the light metering circuit 21 (Step #52). The detection of the shake amount of an object light image by the shake amount detecting circuit 31 is started in view of this detection result (Step #54), and the shake amount detection value D(n) detected in the specified cycle is displayed in the display areas A3, A4 of the display portion 361 inside the viewfinder (Step #56). On the other hand, if the shake correction mode is not set (NO in Step #50), Steps #52 to #56 are skipped and, therefore, the shake amount D(n) is neither detected nor displayed.

Subsequently, it is discriminated whether the shutter release button 8 is partly pressed to turn the switch S1 on (Step #58). If the switch S1 is off (NO in Step #58), this routine returns to Step #50 and the detection and display of the shake amount D(n) are continued (a loop of #50 to #58) in accordance with the set state of the shake correction mode until the switch S1 is turned on.

When the switch S1 is turned on (YES in Step #58), an object distance is detected by the distance metering circuit 22; an AF control value of the taking lens 3 is calculated based on the detected object distance; and the AF control of the taking lens 3 is performed based on this AF control value (Step #60). Subsequently, the object brightness is detected by the light metering circuit 21 and exposure control values are set based on the detected object brightness (Step #62).

It is then discriminated whether the shake correction mode is set (Step #64). If the shake correction mode is set (YES in Step #64), a shake correction for the usual camera shake is started (Step #66). The shake correction for the usual camera shake is performed without considering the shake component of the release camera shake since the shutter release button 8 has not yet been operated at this stage.

Specifically, the shake amount D1(n) is detected by the shake amount detecting circuit 31, and the shake correction control value F1(n) is calculated by the shake correction control value calculator 201 of the controller 20 using the shake amount D1(n) in accordance with a specified operational expression shown in Equation (4). The shake correction is performed by driving the shake correction lenses 32, 33 in accordance with the shake correction control value F1(n). In other words, the shake correction lens 32 is driven in X-direction in accordance with the X-direction shake correction control value F1$_x$(n) of the picked image and the shake correction lens 33 is driven in Y-direction in accordance with the Y-direction shake correction control value F1$_y$(n) of the picked image, thereby canceling the shake amounts ξX, ξY of the object light image on the exposure plane.

On the other hand, if the shake correction mode is not set (NO in Step #64), no shake correction is performed by skipping Step #66.

It is then discriminated whether the shutter release button 8 is fully operated to turn the switch S2 on (Step #68). If the switch S2 is off (NO in Step #68), it is discriminated whether the switch S1 is still kept on (Step #70). If the switch S1 is off (NO in Step #70), this routine returns to Step #50. If the switch S1 is still kept on (YES in Step #70), this routine returns to Step #68 and waits on standby for a shutter release until the switch S2 is turned on (a loop of Steps #68, #70).

When the switch S2 is turned on (YES in Step #68), the shake correction is switched to the one for the release camera shake (Step #72).

Specifically, when the switch S2 is turned on, the shake amount D(n) is detected after the sampling count value n is reset. Since this shake amount D(n) is a composite of the shake component D1(n) of the usual camera shake and the shake component D2(n) of the release camera shake, the release shake data BS(n) stored in the memory 203 as the shake component D2(n) of the release camera shake is read, and the shake component D1(n) of the usual camera shake is calculated by subtracting the release shake data BS(n) from the shake amount D(n).

Further, the shake correction control value F1(n) for the shake component of the usual camera shake is calculated in accordance with Equation (4) using the shake component D1(n), and the shake correction control value F2(n) for the shake component of the release camera shake is calculated in accordance with Equation (6) using the shake component D2(n). The shake correction control value G(n) is calculated at the time of occurrence of the release camera shake by adding the shake correction control values F1(n) and F2(n). It should be noted that the shake correction control value F2(n) may be calculated in the shake memory mode using the release shake data BS(n) and be stored in the memory 203.

Then, the shake correction lenses 32, 33 are driven in accordance with the shake correction control value G(n) to perform the shake correction. In other words, the shake correction lens 32 is driven in X-direction in accordance with the X-direction shake correction control value G1$_x$(n) of the picked image and the shake correction lens 33 is driven in Y-direction in accordance with the Y-direction shake correction control value G1$_y$(n) of the picked image, thereby canceling the shake amounts ξX, ξY of the object light image on the exposure plane.

When the shake correction for the release camera shake is subsequently started, the lens shutter 29 is immediately driven to perform a photographing operation (Step #74). Upon the completion of the photographing operation, this routine returns to Step #50 for a next photographing operation after the shake correction is stopped (Step #76) and the film is wound up by one frame (Step #78).

The shake correction immediately after the shutter release button 8 is fully pressed to instruct an exposure is performed using the shake correction control value G(n) which is obtained by adding the shake component F2(n) of the release camera shake to the shake correction control value F1(n) of the usual camera shake and takes account of the shake peculiar to the operation of the shutter release button 8 by the photographer. Accordingly, a time lag between the operation of the shutter release button 8 and the actual exposure which results from the shake correction can be shortened. Thus, even in the case that the shake correction is performed, a picture can be suitably taken without missing a best shutter releasing moment.

Further, since the data of the shake amount BS2(n) of the shake component of the release camera shake can be taken, the shake amount BS2(n) can be set at a proper value even if the shake wave of the release camera shake differs from photographer to photographer.

Although the coefficient k2 of Equation (6) for calculating the shake correction control value F2(n) is set in advance in the foregoing embodiment, it may be determined based on the data of the shake component of the release camera shake which is taken in the shake memory mode.

As described above, the data of the shake amount of the shake component due to the operation of the shutter release member is stored in the memory in advance. When an exposure is instructed by operating this shutter release member, the shake correction control value added with the shake component resulting only from the operation of the shutter release member is calculated using the shake amount detected after the exposure instruction and the stored shake amount, and the shake of the object light image on the exposure plane is corrected using this shake correction control value. Accordingly, a proper exposure can be made by performing the shake correction immediately after the operation of the shutter release member. As a result, the operability of the camera is not reduced and, even if the shake correction is performed, a picture can be quickly taken without missing a best shutter releasing moment.

Also, it should be noted that according to the present invention, the data of the shake correction control value may be stored in the memory.

Further, a photographer actually operates the shutter release member for the calculation of the data of the shake amount of the shake component due to only the operation of the shutter release member which is peculiar to the photographer, and this calculation result is stored in the memory. Accordingly, the shake correction immediately after the operation of the shutter release member is performed, taking account of the shake component resulting only from the shutter releasing operation peculiar to the photographer. Thus, a proper shake correction can be stably performed even if different photographers use this camera.

Furthermore, the data of the shake amount of the above shake component is an average value of the data taken a plurality of times. Accordingly, the data of the shake amount of the shake component resulting only from the operation of the shutter release member which is peculiar to the photographer can be obtained with improved accuracy.

Moreover, the shake amount detected after the exposure instruction is given by operating the shutter release member is separated into the shake component resulting only from the operation of the shutter release member and other shake components. The shake correction control value is calculated for each shake component, and the shake correction is performed for each shake component using the corresponding shake correction control value. Thus, the shake including the shake component resulting from the operation of the shutter release member can be corrected with improved accuracy.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. A camera comprising:
   an optical system which focuses a light image of an object on an exposure plane;
   a shutter release member which is operated by a camera user to instruct an exposure;
   a shake amount detector which detects a shake amount of the light image on the exposure plane;
   a memory which stores data in connection with a shake due to a motion of the camera accompanied by operation of the shutter release member by a photographer;
   a calculator which calculates a shake correction control value based on a shake amount detected by the shake amount detector after operation of the shutter release member and the data stored in the memory; and
   a controller which controls the optical system in accordance with a calculated shake correction control value to correct a shake of the light image on the exposure plane.

2. A camera according to claim 1, wherein the optical system includes:
   a first shake correction lens which is movable in a first direction on a reference plane perpendicularly intersecting an optical axis of the optical system; and
   a second shake correction lens which is movable in a second direction on the reference plane, the second direction being perpendicular to the first direction on the reference plane.

3. A camera according to claim 2, wherein the controller includes:
   a first driver which drives the first shake correction lens; and
   a second driver which drives the second correction lens.

4. A camera according to claim 1, wherein the controller includes:
   a first driver control circuit which controls the first driver; and
   a second driver control circuit which controls the second driver.

5. A camera according to claim 1, wherein the calculator calculates:
   a first shake correction control value for correcting a shutter operation shake due to operation of the shutter release member; and
   a second shake correction control value for correcting a shake other than the shutter operation shake.

6. A camera according to claim 1, further comprising an instruction member which instructs the controller to execute the shake correction and to permit a corrected light image to be recorded.

7. A camera according to claim 1, further comprising a display portion which displays a state of shake.

8. A camera according to claim 1, wherein the data stored in the memory includes a shake amount due to operation of the shutter release member.

9. A camera comprising:
   an optical system which focuses a light image of an object on an exposure plane;
   a shutter release member which is operated by a camera user to instruct an exposure;
   a shake amount detector which detects a shake amount of the light image on the exposure plane at a specified timing;

a data generator which generates data in connection with a shake due to a motion of the camera accompanied by operation of the shutter release member based on a shake amount detected by the shake amount detector after operation of the shutter release member by a photographer;

a memory which stores the data generated by the data generator;

a calculator which calculates a shake correction control value based on a shake amount detected by the shake amount detector after operation of the shutter release member and the data stored in the memory; and a controller which controls the optical system in accordance with, a calculated shake correction control value to correct a shake of the light image on the exposure plane.

10. A camera according to claim 9, further comprising an instruction member which makes the data generator to generate data in connection with a shake due to operation of the shutter release member.

11. A camera according to claim 9, further comprising an instruction member which instructs the controller to execute the shake correction and to permit a corrected light image to be recorded.

12. A camera according to claim 9, further comprising a display portion which displays a state of shake.

13. A camera according to claim 9, wherein the calculator calculates:

a first shake correction control value for correcting a shutter operation shake due to operation of the shutter release member; and a second shake correction control value for correcting a shake other than the shutter operation shake.

14. A camera according to claim 9, wherein the data stored in the memory includes a shake amount due to operation of the shutter release member.

15. A method for correcting a shake of a camera, comprising the steps of:

detecting a shake amount of a light image of an object on an exposure plane after operation of a shutter release member;

calculating a non-shutter-release shake amount due to causes other than operation of the shutter release member by subtracting a shutter-release shake amount due to a motion of the camera accompanied by operation of the shutter release member by a photographer from the detected shake amount, the shutter-release shake amount being stored in a memory in advance;

calculating a first shake correction control value based on a calculated non-shutter-release shake amount;

calculating a second shake correction control value based on the shutter-release shake amount stored in the memory;

calculating a net shake correction control value by adding up the first and second shake correction control values; and controlling an optical system for focussing the light image on the exposure plane in accordance with a calculated net shake correction control value to correct a shake of the light image on the exposure plane.

16. A method according to claim 15, wherein the shutter-release shake amount is stored in the memory by the steps of:

repeating a specified number of times a sequence of:
detecting a shake amount of a light image of an object on the exposure plane at a specified timing;
calculating a shutter-release shake amount due to operation of the shutter release member by subtracting a specified usual shake amount from a detected shake amount; and calculating an average of shutter-release shake amounts obtained by the sequence; and storing a calculated average amount in the memory as a shutter-release shake amount for the camera.

* * * * *